United States Patent

Athanasoulas

[15] 3,661,037
[45] May 9, 1972

[54] SAW BLADES AND MACHINES FOR SERVICING THEM

[72] Inventor: Evangelos G. Athanasoulas, 20 Alexandrow Zarra Street, Arta, Greece

[22] Filed: Nov. 26, 1969

[21] Appl. No.: 880,343

[30] Foreign Application Priority Data

Nov. 28, 1968 Greece......................................36114

[52] U.S. Cl............................................76/58, 76/35, 76/43
[51] Int. Cl..........................................................B23d 63/04
[58] Field of Search........................76/40, 41, 37, 43, 71, 58, 76/35

[56] References Cited

UNITED STATES PATENTS

| | | | |
|---|---|---|---|
| 1,318,659 | 10/1919 | Garrison | 76/71 X |
| 1,490,668 | 4/1924 | Herbert | 76/37 |
| 2,245,984 | 6/1941 | Knowles | 76/35 |
| 2,498,167 | 2/1950 | Lorenz | 76/58 |
| 3,308,688 | 3/1967 | Stier | 76/43 |

Primary Examiner—Bernard Stickney
Attorney—W. Britton Moore

[57] ABSTRACT

The teeth of a saw blade and particularly of a band saw blade are transversely set so that, for each such set tooth a portion of the tooth bounded by its leading edge and by an outwardly extending line of set is disposed transversely to the remainder of the tooth. The line of set extends edgewise outwardly from the leading edge of the tooth along a line generally parallel to the leading edge. A machine for performing a servicing operation such as tooth-sharpening and/or tooth-setting comprises a clamping device for periodically clamping and releasing the saw blade and a sharpening and/or tooth-setting device for operating on the teeth of the blade while it is clamped. A blade advance mechanism includes a toothed plate which engages several teeth of the blade and reciprocates longitudinally to advance the blade through the machine when the clamp is released. The sharpening wheel and the tooth-setting device are usefully adjustable to permit variation of the sharpening angle, of the depth of set, of the transverse extent of setting, of the angle between the line of set and the longitudinal direction of the blade and of the setting sequence along the blade.

24 Claims, 33 Drawing Figures

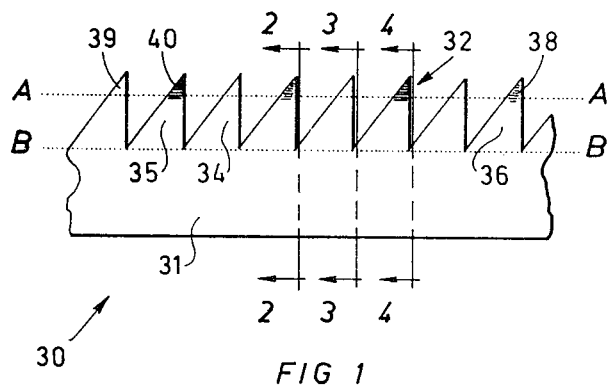
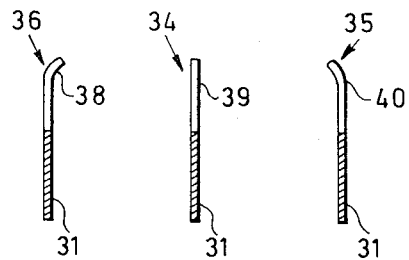
FIG 1    FIG 2  FIG 3  FIG 4
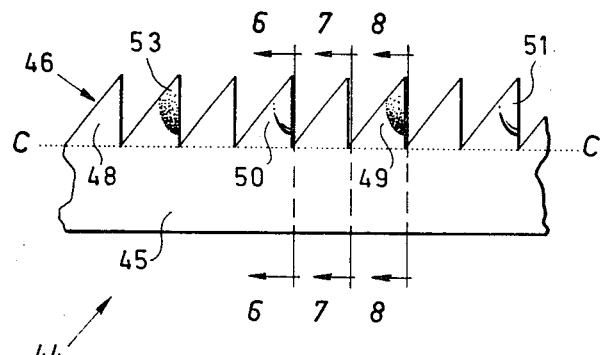
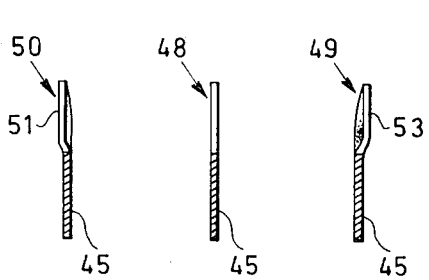
FIG 5    FIG 6  FIG 7  FIG 8
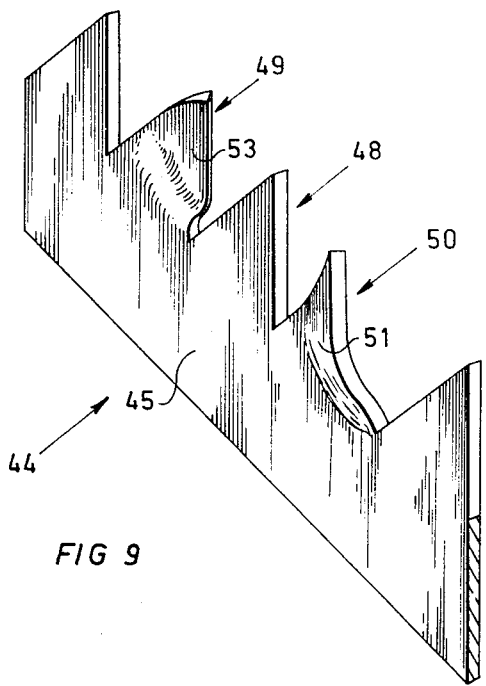
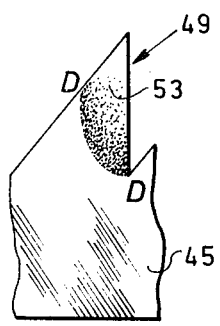
FIG 9    FIG 10
INVENTOR:
EVANGELOS G. ATHANASOULAS
BY W. Britton Moore
ATTORNEY

INVENTOR:
EVANGELOS G. ATHANASOULAS
BY
ATTORNEY

INVENTOR:
EVANGELOS G. ATHANASOULAS

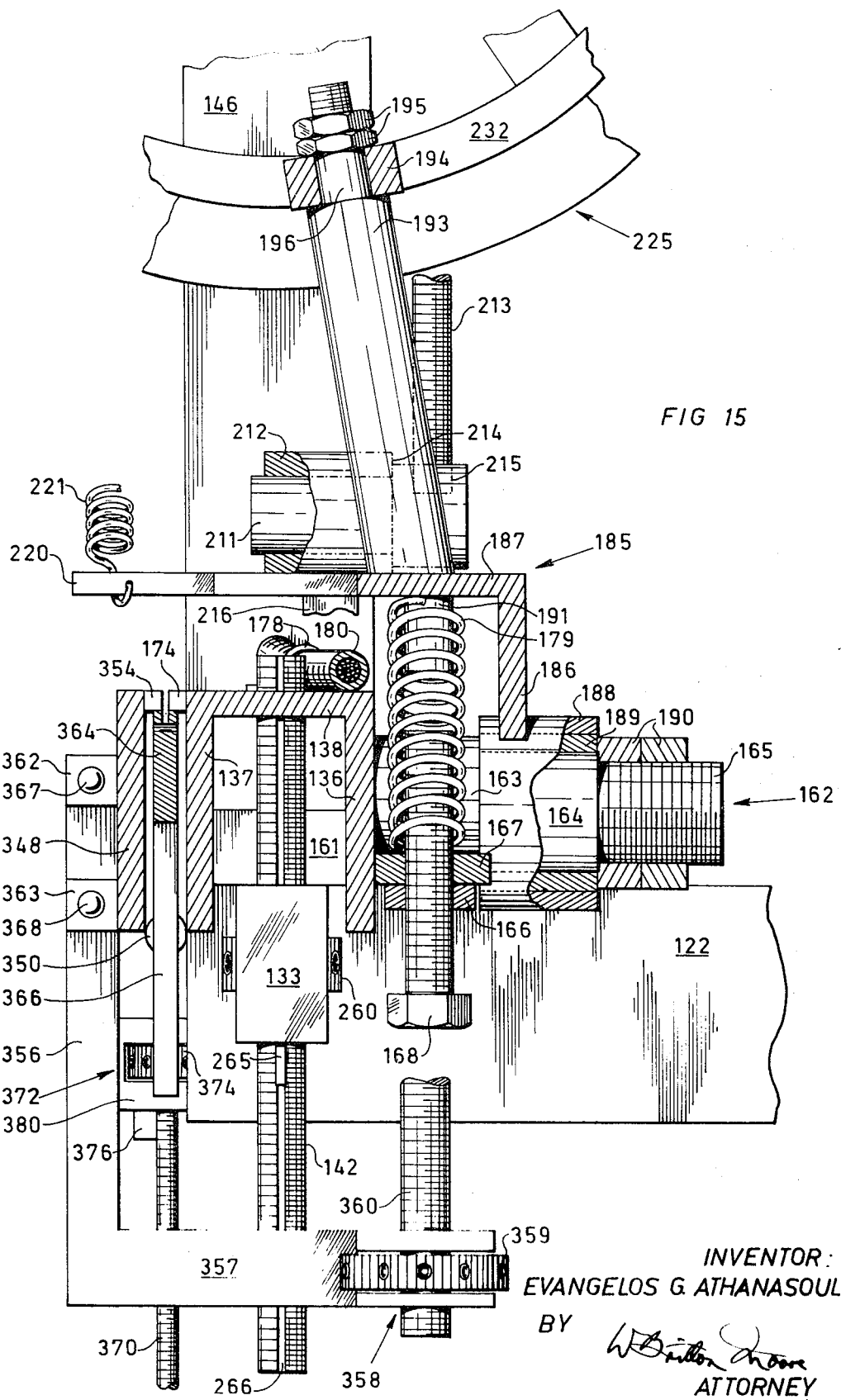

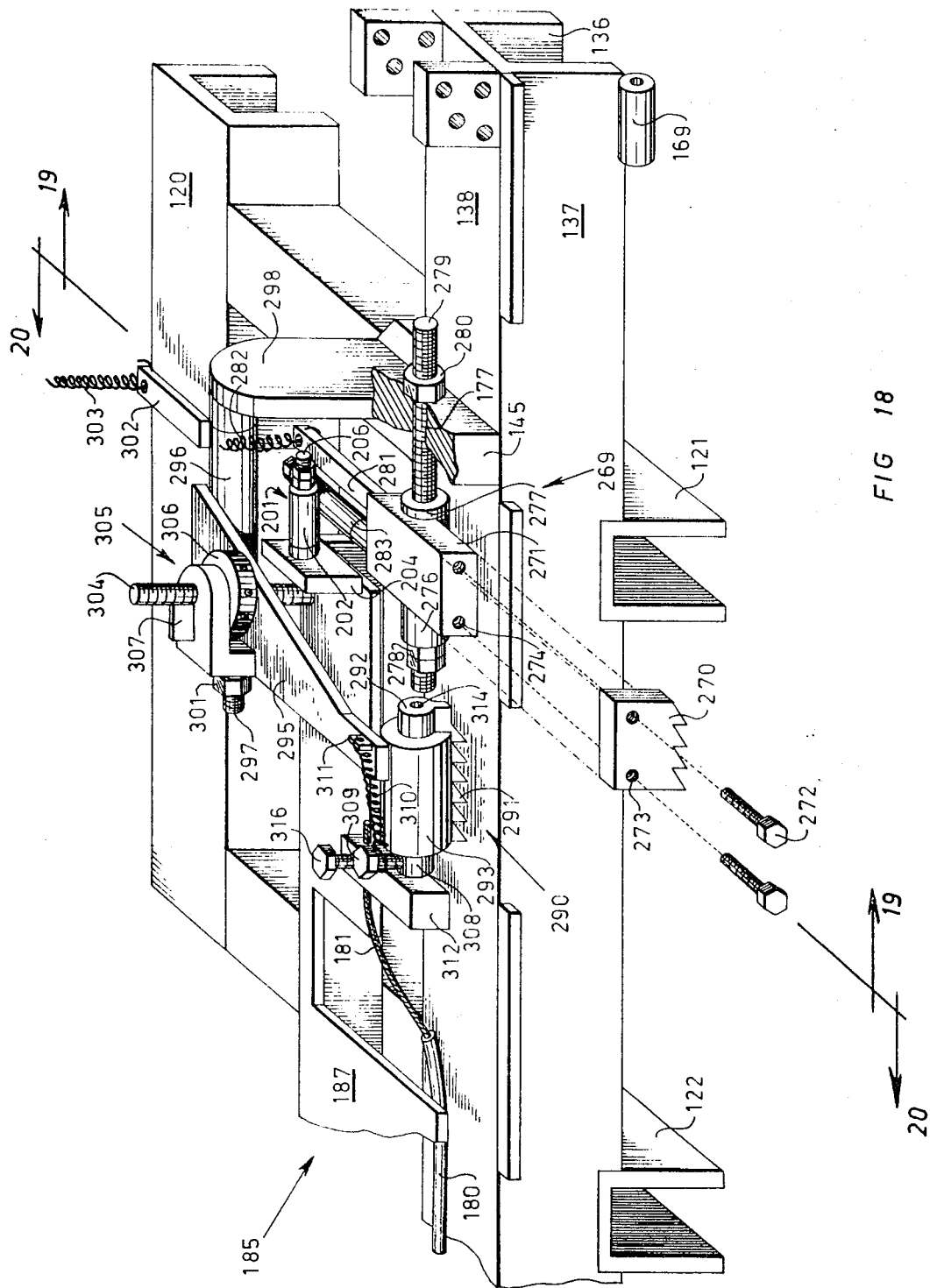

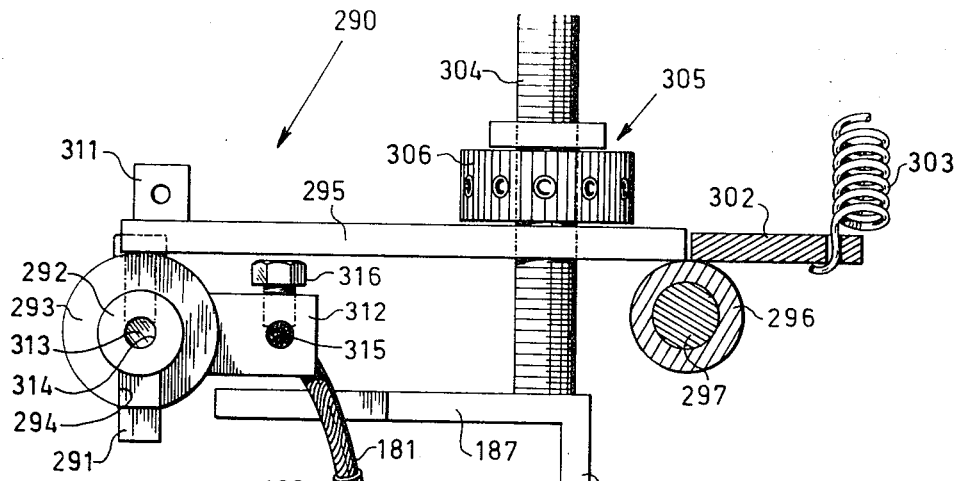
FIG 20
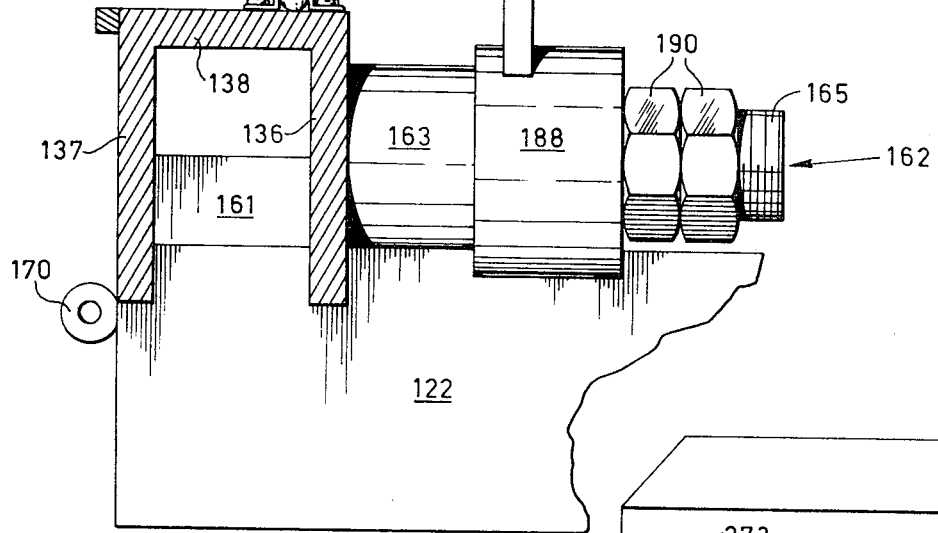
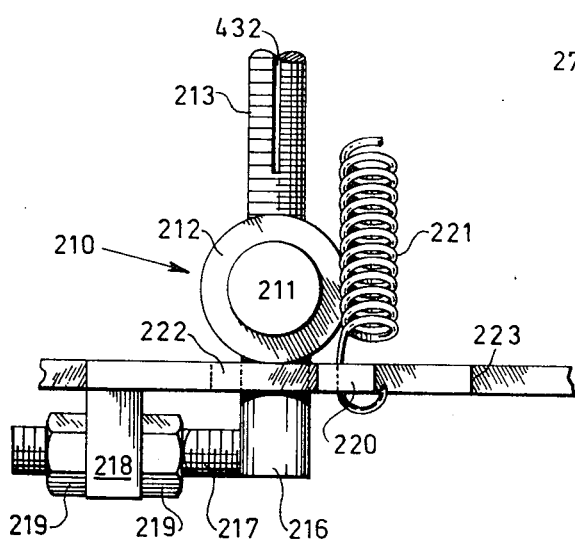
FIG 33
FIG 28
INVENTOR:
EVANGELOS G. ATHANASOULAS
BY
ATTORNEY

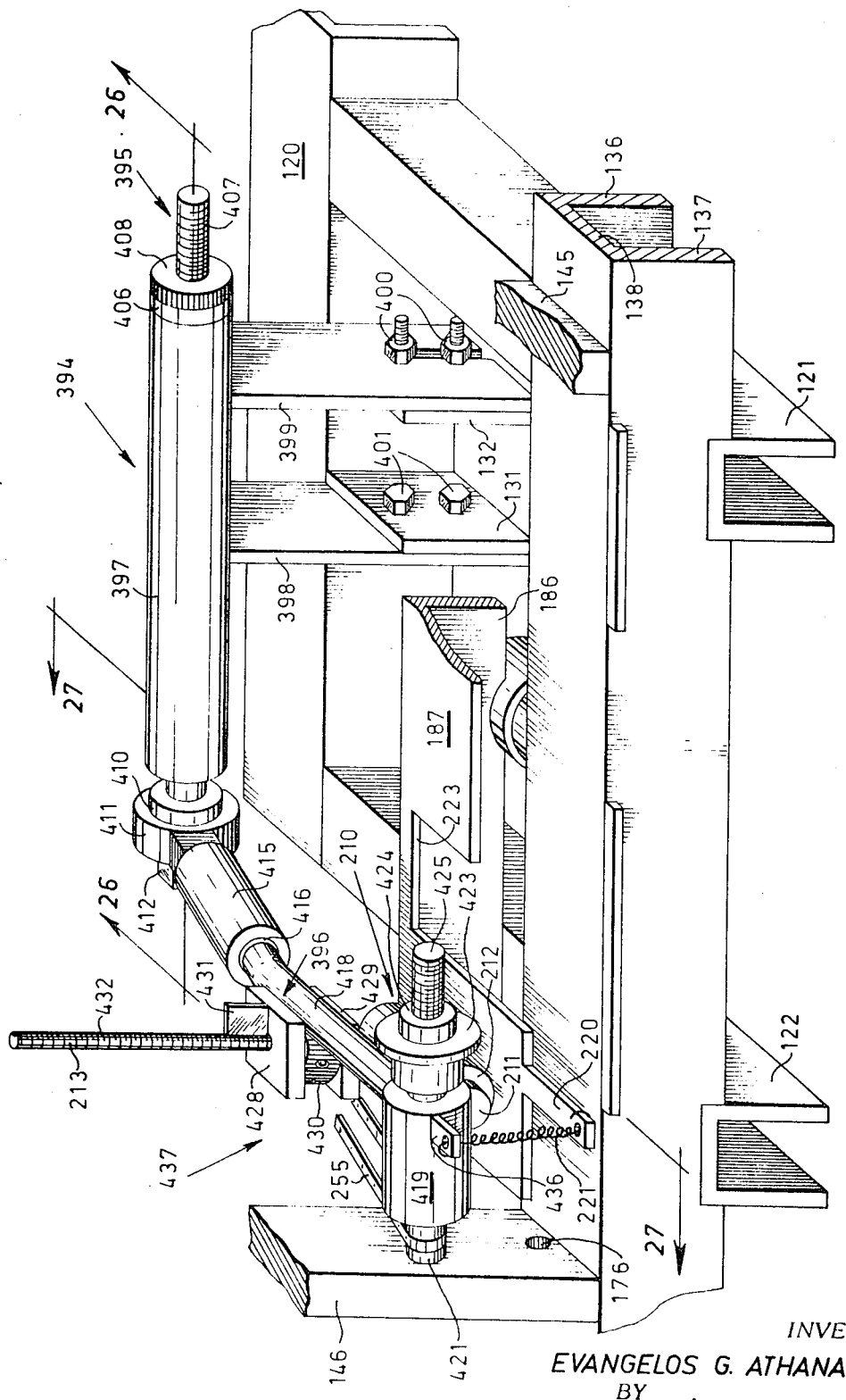

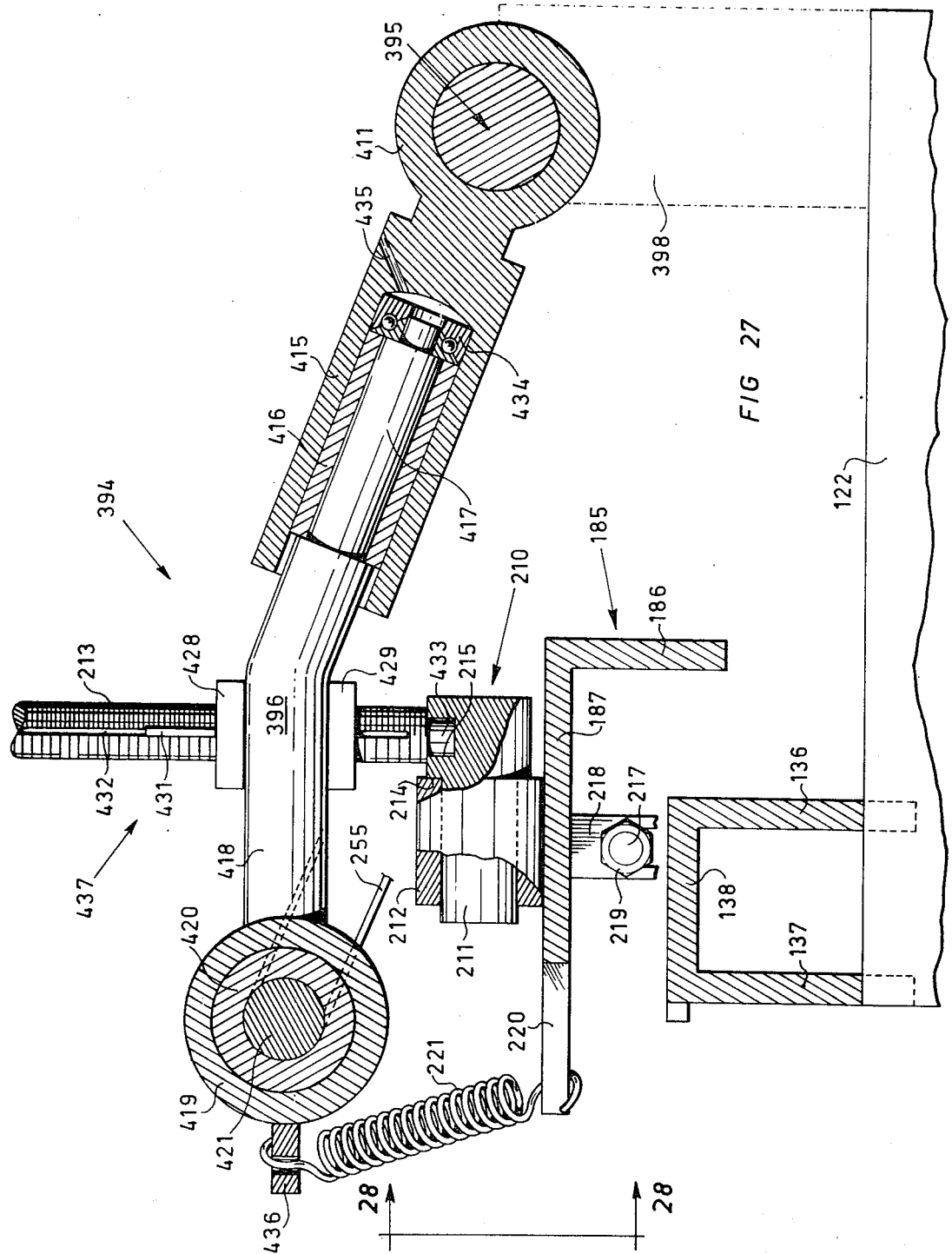

INVENTOR:
EVANGELOS G. ATHANASOULAS
BY
ATTORNEY

3,661,037

SAW BLADES AND MACHINES FOR SERVICING THEM

BACKGROUND OF THE INVENTION

The present invention relates to novel saw blades and to a method for setting the teeth of such blades. The invention also relates to machines for performing servicing operations, such as tooth-setting and tooth-sharpening, on saw blades. The method and machines of the present invention are particularly applicable to the setting and sharpening of band saw blades.

One important object of the present invention is to provide a saw blade, the teeth of which are set in a novel manner to provide highly effective performance during a cutting operation using such a saw blade. More particularly, the invention provides a saw blade which is especially effective in removing saw dust from the kerf of a saw cut and which needs to have its teeth re-set somewhat less frequently than is the case for conventionally set blades.

Another important object of the invention is to provide a novel method for setting the teeth of a saw blade which method is particularly applicable to the setting of the teeth of band saw blades.

A further important object of the invention is to provide a machine for performing a servicing operation, such as tooth-setting and/or tooth-sharpening, on a saw blade, which machine is characterized by its versatility, reliability in use, high operating speed, simplicity of construction, and relatively low manufacturing and operating costs.

Another object of this invention is to provide a machine of the aforementioned type which machine is readily adjustable to accommodate saw blades of different sizes and having teeth of different pitch values.

Yet another object of the invention is to provide a machine of the aforementioned type which machine can be used to set the teeth of a saw blade according to the novel method of the invention.

Another object of the invention is to provide a machine of the type described, the operation of which is not adversely affected in the event that some of the teeth of the saw blade are damaged.

SUMMARY OF THE INVENTION

In its broadest scope, a novel saw blade according to the invention can be defined as comprising an elongated spine and integrally formed with said elongated spine a plurality of teeth extending edgewise outwardly from said spine, each said tooth comprising a leading edge and a trailing edge and said trailing edge subtending a smaller angle than said leading edge with said spine, and in which at least some of said teeth are set transversely with respect to said elongated spine, each such transversely set tooth being set about a line of set extending outwardly from the leading edge of the tooth to the trailing edge thereof.

The method of the invention for setting a tooth of a saw blade having an elongated spine and a plurality of teeth extending edgewise outwardly therefrom, each such tooth having a leading edge and a trailing edge and said trailing edge subtending a smaller angle with said elongated spine than said leading edge, broadly comprises transversely deforming a portion of said tooth about a line of set extending from said forward edge of said tooth outwardly to said trailing edge thereof.

A machine in accordance with the invention for performing a servicing operation on the teeth of a saw blade having a first edge and a second edge defining an elongated spine with a plurality of teeth extending edgewise outwardly from said first edge of said blade, each said tooth having a leading edge and a trailing edge and said trailing edge of each said tooth subtending a smaller angle than said leading edge thereof with said first edge of said blade, is broadly defined as comprising a clamping means adapted periodically to be moved between a blade-clamping first position and a blade-releasing second position, a blade-advance means adapted periodically to be moved between a tooth-engaging first position and a blade-releasing second position and additionally adapted periodically to reciprocate longitudinally in engagement with a plurality of said teeth of said blade in a forward direction and for return movement out of engagement with said blade in an opposite longitudinal direction, at least one blade-servicing means adapted periodically to reciprocate between a blade-engaging first position for performing a servicing operation on at least one tooth of said blade and a retracted blade-releasing second position, and control and drive means adapted to drive said clamping means, said blade-advance means and said blade-servicing means in operational synchronization whereby said blade-advance means undergoes conjoint forward movement with said blade while said clamping means and said blade-servicing means are disposed in their blade-releasing second positions and in which said blade is engaged in a clamped position by said blade-clamping means during said blade-servicing operation.

Other objects, features and advantages of the invention will become apparent as the description herein proceeds.

BRIEF DESCRIPTION OF THE DRAWINGS

The invention will now be described merely by way of illustration with reference to the accompanying drawings in which:

FIG. 1 is a fragmentary front elevation of a band saw blade as already known;

FIG. 2 is a transverse section through the blade of FIG. 1 when taken along line 2—2 of that figure;

FIG. 3 is a similar section to that of FIG. 2 but taken along the line 3—3 of FIG. 1;

FIG. 4 is a similar section to those of FIGS. 2 and 3 but taken along the line 4—4 of FIG. 1;

FIG. 5 is a fragmentary front elevation of a useful embodiment of a saw blade in accordance with the present invention;

FIG. 6 is a transverse section through the blade of FIG. 5 when taken along the line 6—6 of FIG. 5;

FIG. 7 is a similar section to that of FIG. 6 but taken along the line 7—7 of FIG. 5;

FIG. 8 is a similar section to those of FIGS. 6 and 7 but taken along the line 8—8 of FIG. 5;

FIG. 9 is an enlarged, fragmentary perspective view of the blade shown in FIG. 5;

FIG. 10 is a fragmentary front elevation of the blade of FIG. 9 showing in greater detail the manner in which in accordance with the present invention an individual tooth of the saw blade is preferably set;

FIG. 15 is a side elevation partly in section taken in the direction of the arrows 15—15 of FIG. 13 showing further details of the drive transmission system of the machine;

FIG. 18 is a fragmentary front perspective view of the machine of FIG. 12 showing in greater detail and partly exploded the blade edge-clamping mechanism provided for holding down the saw blade during the sharpening of its teeth and the advance mechanism provided for advancing the saw blade through the machine between consecutive operating steps;

FIG. 20 is a fragmentary, vertical sectional view taken along the line 20—20 of FIG. 18 showing further details of the blade advance mechanism provided for engaging and advancing the saw blade through the machine between consecutive operations;

FIG. 25 is a fragmentary, front perspective view showing further details of the sharpening wheel mounting and drive sub-assembly provided for supporting the sharpening wheel and for obtaining the necessary vertical reciprocation and adjustment of the position of the sharpening wheel in the machine of FIG. 12;

FIG. 27 is a fragmentary side elevation partly in section of the sharpening wheel mounting and drive subassembly of FIG. 25 when viewed in the direction of the arrows 27—27 of that figure;

FIG. 28 is a fragmentary front elevation of the sharpening wheel mounting and drive sub-assembly when viewed in the direction of the arrows 28—28 of FIG. 27;

FIG. 31 is a fragmentary, horizontal sectional view through the tooth-setting mechanism of FIG. 29 when taken along the line 31—31 of FIG. 12;

FIG. 32 is a fragmentary, vertical sectional view taken along the line 32—32 of FIG. 31; and FIG. 33 is a perspective illustration of a blade-engaging plate having a particularly useful configuration and intended for use in the blade edge-clamping mechanism for holding down the saw blade as shown in FIGS. 18 and 19.

DESCRIPTION OF THE PREFERRED EMBODIMENTS

Figures 11, 16, 17:
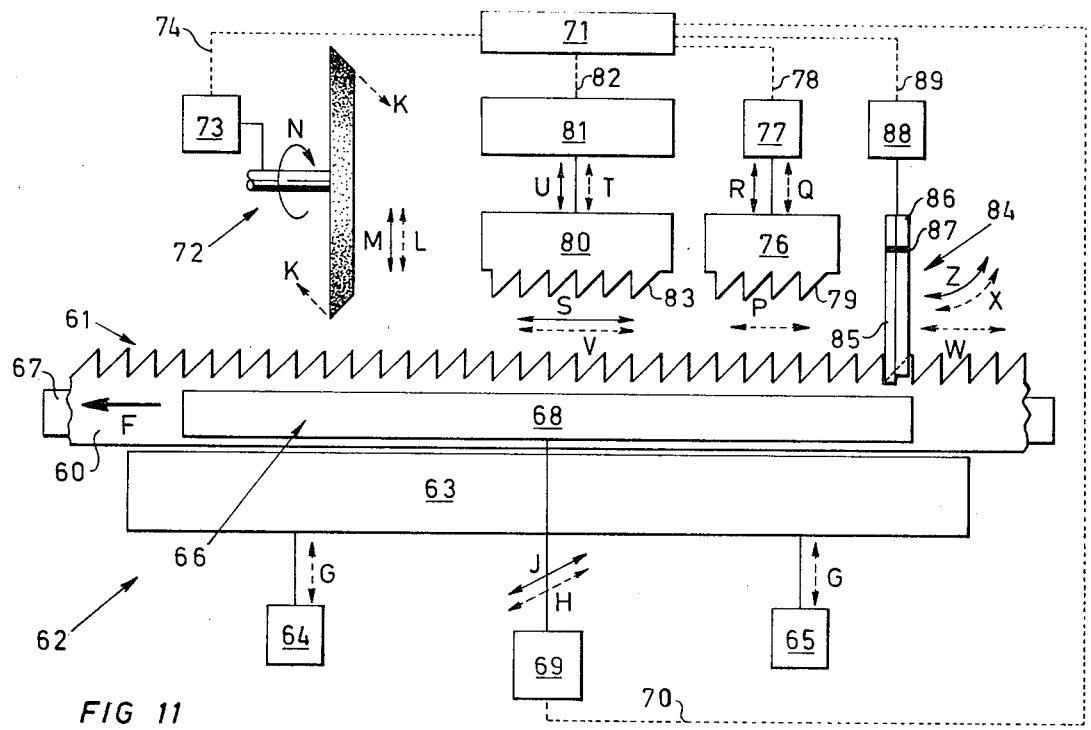
FIG. 11 is a schematic diagram illustrating the general construction and operation of a machine in accordance with the invention for sharpening and/or setting the teeth of a band saw blade.
FIG. 16 is an enlarged elevation of a particularly useful form of screw-adjusting device used in the machine of FIG. 12.
FIG. 17 is a horizontal sectional view through the screw-adjusting device shown in FIG. 16 when taken along the line 17—17 of that figure.

As already indicated, the present invention provides novel saw blades, a method for setting the teeth of saw blades and a machine for sharpening and/or setting the teeth of such saw blades. For convenience, the following description will first be directed to the novel saw blades of the invention and subsequently to the novel method and machine.

SAW BLADES OF THE INVENTION

The saw blade generally indicated at 30 in FIGS. 1 to 4 of the accompanying drawings is representative of those already known and will first be briefly considered. The blade 30 comprises a spine 31 and has integrally formed with that spine a plurality of edgewise projecting teeth generally indicated at 32. As is conventional, some of these teeth are deformed or 'set' transversely to the left while others are transversely set to the right. For the particular blade 30 illustrated, alternate teeth 34 are not set and extend directly from the spine 31 in the principal plane of that spine as shown at 39 in FIGS. 1 and 3. The setting of the intervening teeth 35 is shown as being to the left in FIG. 4 while the teeth 36 are shown as being set to the right in FIG. 2, references to the left and right being understood as applying when the blade 30 of FIG. 1 is viewed from the right-hand end of that figure.

It will now be seen that all the teeth which are set are deformed about a line A—A which is parallel to the longitudinal direction of the blade 30 as indicated by the line B—B of FIG. 1. For example, the tip sections 40 of the teeth 35 are deformed about the line A—A to the left (FIG. 4) while the tip sections 38 of the teeth 36 are deformed about the line A—A to the right (FIG. 2). The tip sections 39 of the teeth 34 are non-deformed.

Reference will now be made to FIGS. 5 to 10 of the accompanying drawings in which there is illustrated a particularly useful embodiment of a saw blade in accordance with the present invention. It will be seen that this blade generally indicated at 44 comprises a longitudinally extending spine portion 45 and a plurality of edgewise extending teeth generally indicated at 46. In the particular blade 44 shown in FIGS. 5 to 10, alternate teeth 48 are not set, i.e., they are disposed in the same plane as the spine 45 as will readily be understood by reference to the drawings.

Between the teeth of alternate pairs of adjacent 'unset' teeth 48, the teeth 50 are deformed or set in one transverse direction as shown in FIGS. 5 and 6 while between other pairs of unset teeth 48, the teeth 49 are transversely set in the opposite transverse direction as shown in FIGS. 5 and 8.

It will also be noted that, in accordance with an important feature of this invention, each of the teeth 49 and 50 is deformed about a line D—D which is disposed angularly with respect to the longitudinal direction of the blade 44 as indicated by the line C—C of FIGS. 5 to 8. In particular it will be noted that for the blade 44 shown in FIGS. 5 to 10, the 'line of set' D—D for each of the set teeth 49 and 50 extends from a leading edge of the tooth outwardly to the trailing edge of the same tooth so as to define a leading tooth portion 53 and 51 respectively which has a leading edge surface disposed generally parallel to but offset from the spine 45 of the blade 44. Furthermore, the line D—D (FIG. 10) usefully curves outwardly from the leading edge of a tooth so as to approach a parallel disposition to such leading edge on reaching the trailing edge of the tooth as is particularly shown in FIG. 9.

Saw blades as exemplified by saw blade 44 have been found to be particularly advantageous in use in providing considerably improved removal of saw-dust from the kerf of a saw cut. It should perhaps be pointed out that the saw blades of the present invention are not restricted to ones in which the setting of the teeth is carried out in the particular tooth-to-tooth sequence actually shown in FIGS. 5 to 10. The invention equally embraces saw blades in which all the teeth are set, for example, alternately to each transverse side of the blade.

A novel method and machine suitable for setting the teeth of a saw blade in the aforementioned manner will be described hereinafter in greater detail.

METHOD AND MACHINE OF THE INVENTION

In an attempt to facilitate understanding of the structure and operation of a machine in accordance with the present invention, the following description herein with reference to FIGS. 11 to 33 of the accompanying drawings will be divided into generally separate considerations of the following aspects and features of the invention:

1. Introduction: A general description of the construction and operation of a machine in accordance with the invention with reference to the schematic illustration of FIG. 11.
2. General description of a specific machine: A general description of a particularly useful embodiment of a machine in accordance with the invention as shown in FIGS. 12 to 33 with more particular reference to the identification of the various sub-assemblies making up the machine as shown in FIG. 12, which sub-assemblies will then be considered in greater detail under separate section headings now to be identified.
3. Supporting frame: as illustrated particularly in FIGS. 13 and 14.
4. Main drive power source and transmission: with particular reference to FIGS. 13, 14, and 15.
5. Blade support and transverse clamping sub-assembly: with particular reference to FIGS. 15, 23, and 24.
6. Blade edge-clamping sub-assembly: with particular reference to FIGS. 18, 19, and 33.
7. Blade advance mechanism: with particular reference to FIGS. 18 and 20.
8. Blade advance transmission: with particular reference to FIGS. 12, 21, and 22.
9. Sharpening wheel mounting and drive sub-assembly: with particular reference to FIGS. 15, 25, 26, 27, and 28.
10. Tooth-setting sub-assembly: with particular reference to FIGS. 12, 29, 30, 31, and 32.
11. Operation and adjustment of the machine. It should perhaps be explained that the same numerals are used in all of FIGS. 12 to 33 of the accompanying drawings for identifying the same structural components and that, as the description herein proceeds, the functions of the various sub-assemblies of the machine of those figures will be compared to those indicated somewhat schematically in FIG. 11. It is also to be noted that many of the figures of the accompanying drawings are fragmentary in that components not relevant to the particular subassembly under consideration have been omitted from the figures to facilitate understanding of the particular structures in question.

1. Introduction

Figure 12:
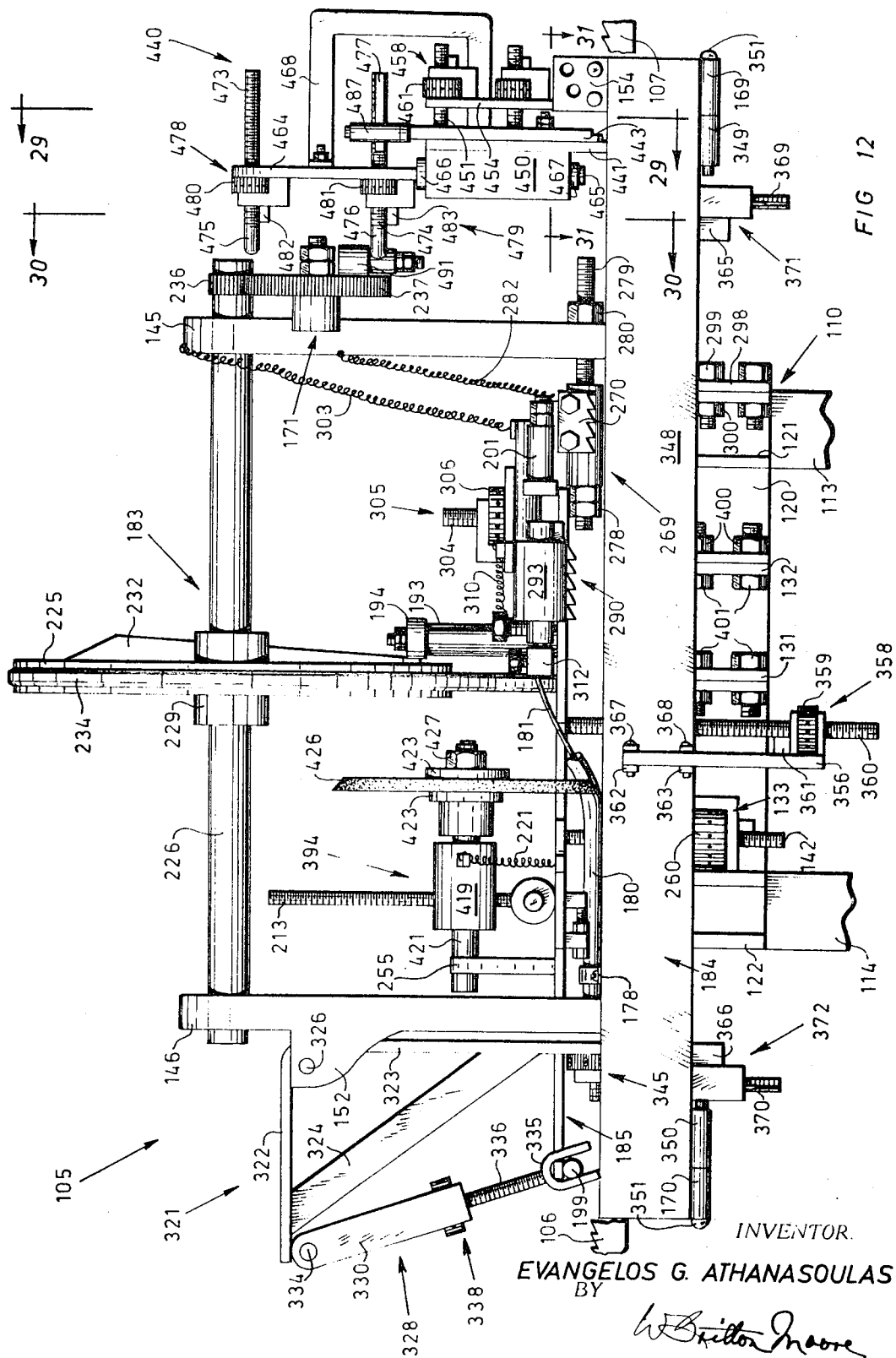
FIG. 12 is a fragmentary front elevation of a particularly useful embodiment of a machine in accordance with the invention for sharpening and/or setting the teeth of a saw blade.

Referring to FIG. 11, there is shown schematically therein a machine for sharpening and/or setting the teeth 61 of a band saw blade indicated generally at 60. The tooth-setting mechanism incorporated in the machine of FIG. 11 is designed to set the teeth 61 as already described with reference to FIGS. 5 to 10 of the accompanying drawings.

It should be noted that the solid line arrows in FIG. 11 indicate the directions of movement of the various component sub-assemblies during operation of the machine while the broken line arrows indicate the directions of possible adjustments which may be made to the machine during a setting-up operation prior to operation on a saw blade therewith.

The machine of FIG. 11 indicated generally therein at 62 comprises a blade support indicated at 63 and adapted to engage the lower edge surface of the blade 60 for maintaining the latter at a required height in the machine 62. Height control means 64 and 65 are shown as being associated with the blade support 63 for the purpose of permitting adjustment of the vertical position of this support as indicated by the arrows G. Such adjustment will of course generally be desired to permit the use of the machine 62 for sharpening and/or setting the teeth of saw blades of different widths (i.e., heights).

The machine 62 of FIG. 11 also includes a transverse clamping sub-assembly generally indicated at 66 and comprising a fixed plate 67 disposed behind the saw blade 60 and a movable clamping plate 68 disposed in front of the saw blade 60. The movable clamping plate 68 is shown as being associated with a clamp control means 69 adapted respectively and periodically to move the front clamping plate 68 towards and away from the blade 60 for the purpose of clamping that blade against the fixed plate 67, and to release the blade. Such periodic reciprocating movement during operation of the machine 62 is provided by a drive transmission indicated schematically by the line 70 from a main drive power source indicated schematically at 71. Such reciprocating movement of the front clamping plate 68 during operation of the machine 62 is indicated by the arrow J while manual transverse adjustment of the front clamping plate 68 for the purpose of accommodating blades of different thicknesses is indicated by the arrow H.

A further clamping function is provided in the machine 62 by the edge-clamping mechanism indicated at 76 and shown as comprising teeth 79 adapted to engage the teeth of the saw blade 60 to hold the blade 60 downwardly against the blade support 63 during the sharpening and/or setting operation. This 'hold-down' clamp mechanism 76 is controlled by a clamp control means 77 which in turn derives drive power from the main drive power source 71 through the line 78. During operation of the machine 62, the hold-down clamp mechanism 76 reciprocates periodically in the vertical direction as indicated by the arrow R. Vertical adjustment of this clamping mechanism 76 is also possible as indicated by the arrow Q for the purpose of accommodating saw blades with teeth of different heights. Longitudinal adjustment of the position of the hold-down clamping mechanism 76 is also possible as indicated by the arrow P for the purpose of aligning the teeth of this clamping mechanism 76 with the teeth of the saw blade 60. Replacement teeth for the clamping mechanism 76 can also advantageously be provided for use with saw blades having teeth of different pitches.

The machine 62 also includes a sharpening wheel indicated at 72 and rotated during operation of the machine as indicated by the arrow N. The wheel 72 is controlled by wheel control means 73 for periodic vertical reciprocating movement as indicated by the arrow M between a lowered tooth-sharpening position and a raised inoperative position in which it is disposed out of engagement with the teeth 61 while the blade 60 is being advanced through the machine 62 in a manner yet to be described. Drive power is supplied to the wheel control means 73 from the main drive power source 71 by a line 74.

The machine 62 usefully includes means for adjusting the position of the sharpening wheel 72. For example, adjustment of the vertical position of the wheel 72 is indicated by the arrow L while angular adjustment of the position or slope of the wheel (in the plane of the paper) is indicated by the arrows K. Adjustment of the position of the sharpening wheel 72 along the blade 60 may also be desirable but such adjustment is not illustrated since all the other relevant sub-assemblies of the machine 62 are so adjustable and it is permissible for any one sub-assembly to be non-adjustable. The selection of a different sub-assembly as the 'fixed' one is, however, clearly within the scope of the invention.

Advance movement of the blade 60 through the machine 62 is provided by a blade advance mechanism indicated at 80. This mechanism 80 comprises a member having teeth 83 adapted to engage the teeth 61 of the blade 60 and, while in engagement therewith and while the blade 60 is released by the front clamping plate 68 and by the blade hold-down clamping mechanism 76, to move the blade 60 through the machine 62, as indicated by the arrow F a distance normally corresponding to the separation between an adjacent pair of the teeth 61 so as to align a further one of the teeth 61 with the sharpening wheel 72.

To this end, the blade advance mechanism 80 is driven by advance control means indicated at 81 for reciprocating movement in two directions. The first such movement is indicated by the arrow S and constitutes the periodic blade advance movement and retraction of the mechanism 80 while disengaged from the blade 60. The second movement is a vertical periodic reciprocating movement as indicated by the arrow U which moves the teeth 83 of the mechanism 80 between a lowered tooth-engaging position and a raised tooth-releasing position.

Adjustment of the position of the blade advance mechanism 80 longitudinally with respect to the blade 60 is possible as indicated by the arrow S while adjustment of the vertical position of the mechanism 80 is possible as indicated by the arrow T. As is the case for the hold-down clamping mechanism 76, the mechanism 80 may be provided with replacement teeth for use with saw blades having teeth of different pitches. Drive power is transmitted from the main drive power source 71 to the control means 81 through line 82.

If the machine 62 is also to be used for setting the teeth 61 of the saw blade 60, it will, as illustrated, be provided with a tooth-setting mechanism as indicated generally at 84. A particularly useful structure for such a tooth-setting mechanism will be described hereinafter in greater detail with reference to the machine shown in FIG. 12 but it can be noted at this juncture that the mechanism 84 shown in FIG. 11 comprises a fixed slotted plate 85 and a movable slotted plate 86 pivoted at 87 on the fixed slotted plate 85. The plates 85 and 86 are dimensioned so that one half of one of the teeth 61 of the blade 60 is engaged in the slot of the fixed plate 85 while the 'deeper' half of the same tooth is received within the slot of the movable plate 86. In this way, pivoting movement of the movable plate 86 with respect to the fixed plate 85, as indicated by the arrow Z causes the tooth in such slots to be set as already described with reference to FIGS. 5 to 10.

The tooth-setting mechanism 84 is driven by a setter control means indicated at 88 which in turn receives drive power from the main drive power source 71 through a line 89. Adjustment of the position of the tooth-setting mechanism 84 along the blade as indicated by the arrow W is possible as is adjustment of the 'angle of set' as indicated by the arrow X.

Having described the principal sub-assemblies of the machine 62, its manner of operation will now be briefly summarized. The operation will be considered as commencing at the instant that the sharpening of a tooth 61 of the blade 60 by the sharpening wheel 72 will be retracted vertically upwardly by the wheel control means 73 as indicated by the arrow M.

At this same time, the hold-down clamping mechanism 76 will be raised by clamp control means 77 as indicated by arrow R and the movable clamping plate 68 will be moved transversely away from the fixed clamping plate 67 by the clamp control means 69 to release the blade 60.

At this time, the blade advance mechanism 80 will have been lowered by its control means 81 into its lowered blade-engaging position as indicated by the arrow U. Additionally, the movable plate 86 of the tooth-setting mechanism 84 will have pivoted into a central tooth-releasing position under the control of its control means 88 as indicated by arrow Z.

With the blade 60 now completely released by all the sub-assemblies except the blade advance mechanism 80, the blade advance control means 81 operates to move this advance mechanism 80 to move the blade 60 in turn in the direction of the arrow F a distance corresponding to the separation between two adjacent ones of the teeth 61.

When such advance movement of the blade 60 has been completed, the control means 69 and 77 operate so as to cause the front clamping plate 68 and the hold-down clamping mechanism 76 respectively to return into their blade-clamping positions. During such clamping operations, the blade advance mechanism 80 is elevated by its control means 81 into its raised blade-releasing position and is itself retracted in the opposite direction to the arrow F as indicated by the arrow S.

With the blade 60 again clamped by the front clamping plate 68 and by the hold-down clamping mechanism 76, the sharpening wheel 72 is lowered by its control means 73 as indicated by the arrow M to sharpen the tooth disposed therebelow. If the teeth 61 of the blade 60 are also to be set, the setter control means 88 will also operate at this time to pivot the movable plate 86 of that mechanism forwardly or rearwardly in the transverse direction, as appropriate and as indicated by the arrow Z.

Although the operation of the machine 62 has been described with reference to the simultaneous setting and sharpening of the teeth 61 of the saw blade 60, it will be understood that the machine 62 can, if desired, be used for sharpening alone, or for setting such teeth without sharpening them. In practice, such alternative operating procedures are desirable since the teeth of band saw blades generally require sharpening more frequently than they require to be reset.

Insofar as the preceding description with reference to FIG. 11 is concerned, no indication has been made of the means for transmitting drive motion to the several sub-assemblies or of the manner in which the operations of such sub-assemblies are effectively synchronized. Although the description hereinafter will proceed with reference to the use of a mechanical system for this purpose, the use of electrical, hydraulic or other systems are not precluded.

It should also be understood that the invention is not restricted to the precise sequence of steps hereinbefore outlined, it being understood that there are, however, certain operating sequences which must be met. For example, clamping of the blade 60 must be positively established before operation of the setting and sharpening mechanisms and disengagement of such last-mentioned mechanisms and of both the blade-clamping means 68 and 76 must be complete before forward actuation of the blade advance mechanism 80 takes place.

2. General description of a specific machine

The machine indicated generally at 105 in FIG. 12 for sharpening and/or setting the teeth 106 of a saw blade 107 and particularly of a band saw blade comprises a main supporting frame generally indicated at 110, a main drive power source and transmission generally indicated at 183, a blade support and transverse clamping sub-assembly generally indicated at 184, a blade edge-clamping or hold-down sub-assembly generally indicated at 269, a blade advance mechanism generally indicated at 290, a blade advance transmission generally indicated at 321, a sharpening wheel generally indicated at 426, a sharpening wheel mounting and drive-sub-assembly generally indicated at 394, and a tooth-setting sub-assembly generally indicated at 440.

3. Supporting frame

The structure of the main supporting frame generally indicated at 110 will be explained principally with reference to FIGS. 13 and 14. Certain component parts of this frame 110 are, however, shown on the other figures of the drawings to illustrate the manners in which the other sub-assemblies are mounted on the frame 110.

It should be noted that references hereinafter to the "right-hand" and "left-hand" sides of the machine will apply when the machine is viewed from the front, i.e., as illustrated in FIG. 12.

The frame 110 includes a pair of generally parallel channel bars 111 and 112 on which spaced apart upright members 113 and 114 respectively are suitably secured and braced by a diagonal braces 115. Mounting holes 116 are provided in the bars 111 and 112 for securing the machine 105 to a workbench or on a vertical wall surface. For convenience, the description hereinafter will be directed to a machine designed to be disposed on a horizontal surface but, when words such as "vertical" and "horizontal" are used herein, it should be understood that they are not intended to restrict this invention to a machine intended for use in such a horizontal disposition.

A rear longitudinally disposed channel bar 120 is mounted across the upper ends of the upright members 113 and 114 and channel bars 121 and 122 are secured to the channel bar 120 and extend forwardly therefrom to provide a support table generally indicated at 118. Spaced apart guide tracks generally indicated at 124 and 125 and formed from inverted angle bars 126, 127 and 128, 129 respectively are provided so as to project rearwardly and forwardly from the rear channel bar 120. Mounting flanges 131 and 132 extend forwardly from the rear channel bar 120. A bracket generally indicated at 133 is mounted on the inner surface of the channel bar 122 at the front end thereof for a purpose yet to be explained.

A front, inverted channel bar generally indicated at 135 and having a front leg 137, a rear leg 136 and a horizontal web 138 is secured at notches 139 and 140 on the forward ends of the channel bars 121 and 122. The front leg 137 of the channel bar 135 constitutes a fixed clamping plate of the machine 105 and corresponds to the fixed clamping plate 67 of the machine 62 of FIG. 11. A threaded rod 142 (FIG. 14) extends through a hole 143 in the web 138 of the channel bar 135 for a purpose yet to be explained. The rod 142 is provided with a longitudinally extending groove 266 in its peripheral surface as can best be seen in FIG. 15.

A pair of spaced apart posts 145 and 146 are mounted on the upper surface of the web 138 of the channel bar 135 and these posts 145 and 146 are provided at their upper ends with bores 147 and 148 respectively through which a main pulley shaft 226 is disposed. Each of the bores 147 and 148 is provided at its inner end with an annularly enlarged housing 149 (FIG. 14) in which shaft bearings 228 are disposed.

The left-hand post 146 includes a pair of flanges 151 and 152 which extend to the left-hand side of the post and which are bored as at 153 to support the blade advance transmission sub-assembly 321. The web 138 is cut away at its left-hand end as at 160 to accommodate this blade advance transmission sub-assembly 321. The legs 136 and 137 of the channel bar 135 are strengthened at this left-hand end by an end plate 161.

Upstanding plates 154 and 155 having a number of openings 156, 157, 158, and 159 formed therethrough are mounted on the channel bar 135 at the right-hand end thereof for the purpose of mounting the tooth-setting sub-assembly 440.

On the rear surface of the rear leg 136 of the channel bar 135 and between the posts 145 and 146, a rearwardly projecting pivot shaft generally indicated at 162 is mounted for pivotally supporting a rocker bar generally indicated at 185 of the main drive transmission 183 as will be explained in a subsequent section herein. From FIG. 15, it will be seen that the pivot shaft 162 comprises a forwardly disposed portion 163 secured to the rear leg 136 of the bar 135, a central portion 164 of reduced diameter and a rearward threaded portion 165.

A rearwardly projecting flange 167 is secured to the rear surface of the rear leg 136 and a short bolt 168 is threadingly received upwardly through a hole in this flange 167. A nut 166 (FIG. 15) is provided on this bolt 168 for locking it in a desired position. A helical compression spring 179 is disposed around the upper part of the shaft of the bolt 168 above the flange 167.

At the ends of the front leg 137 of the channel bar 135, hinge sleeves 169 and 170 are secured at the lower edge surfaces of the leg 137 for the purpose of mounting a movable clamping plate 348 (FIGS. 12, 15 and 23) of the transverse clamping subassembly 184 and corresponding to the movable plate 68 of the machine 62 of FIG. 11.

A shaft generally indicated at 171 is mounted on the right-hand post 145 for the purpose of mounting a driven gear 237 for the tooth-setting sub-assembly 440.

Four bars 172, 173, 174, and 175 of square cross-sectional configuration are mounted in spaced apart positions along the upper front edge of the front leg 137 of the channel bar 135 for a purpose which will be explained hereinafter.

Figure 14:
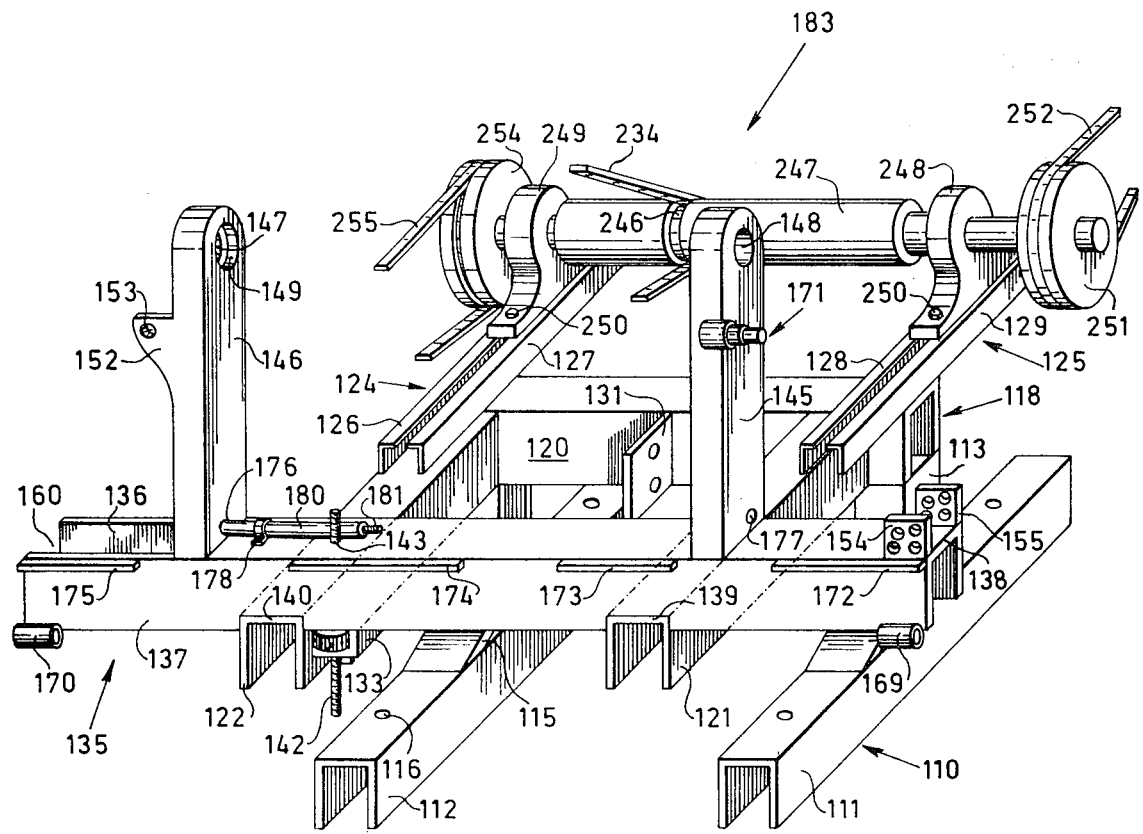
FIG. 14 is a fragmentary, front perspective view of the machine of FIG. 12 showing further details of the main supporting frame with its main driving shaft mounted thereon.

A hole 176 is provided through the post 146 near the lower end thereof for receiving a cable linkage having an outer cover 180 and an inner cable 181 movable therein, as shown fragmentarily in FIG. 14. A saddle clip 178 is provided for holding this cable in position on the web 138. A threaded hole 177 is provided through the right-hand post 145 near the lower end thereof for adjustably mounting the blade edge clamping or holddown sub-assembly 269.

4. Main drive power source and transmission

Figure 13:
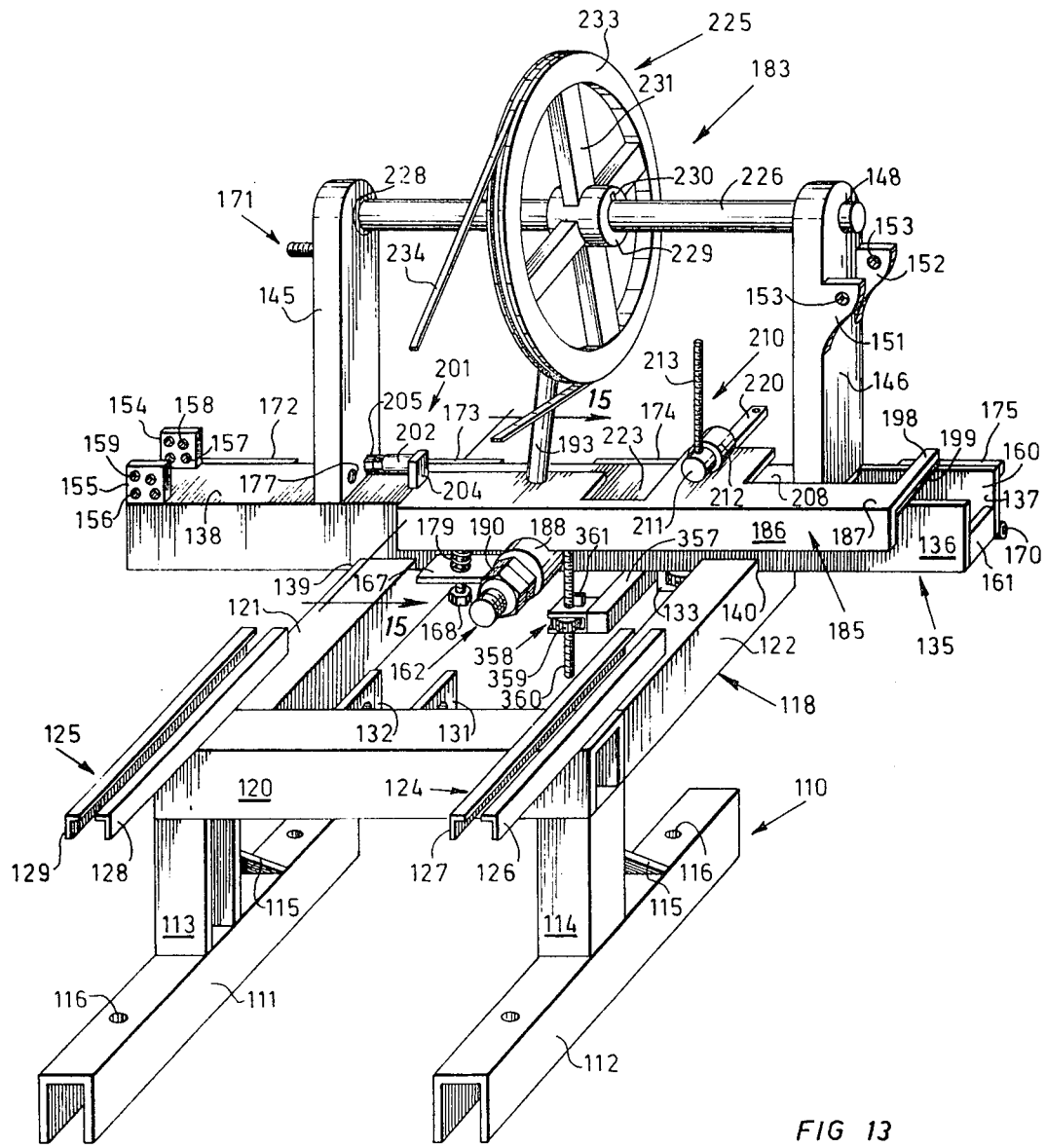
FIG. 13 is a fragmentary perspective view from the rear of the machine of FIG. 12 showing the main supporting frame and part of the drive transmission of that machine.

The main drive power source and transmission 183 comprises, as particularly shown in FIG. 13, the main pulley shaft 226 supported in the shaft bearings 228 in the bearing housings 149 (FIG. 14) in the posts 145 and 146. A main pulley generally indicated at 225 has a sleeve hub 229 keyed as at 230 to the shaft 226 and has a rim 233 supported by spokes 231. A belt 234 trained around the main pulley 225 transmits rotary drive movement thereto from a main drive shaft 247 (FIG. 14).

Referring further to FIG. 14, it will be seen that the main drive shaft 247 is mounted in bearing blocks 248 and 249 which are releasably clamped in position on the guide tracks 125 and 124 respectively by bolts 250. The aforementioned belt 234 is received within a recess 246 in the main drive shaft 247.

Drive power is provided to the main drive shaft 247 by a belt 252 entrained around a driven pulley 251 suitably keyed to the shaft 247 at the right-hand end thereof, the belt 252 being driven from any suitable motive power source. A pulley 254 is keyed to the other end of the shaft 247 and a belt 255 entrained around this pulley 254 is provided to transmit drive power to the sharpening wheel 426 as will be explained in greater detail hereinafter.

Referring again to the main pulley 225, it will be seen from FIGS. 12 and 15 that this pulley is provided with a cam 232 mounted a small distance radially inwardly of the rim 233. This cam 232 co-operates with a cam follower roller 194 (FIGS. 12 and 15) which is rotatably retained about an upper reduced portion 196 of a pillar 193 by nuts 195. The pillar 193 is mounted on the aforementioned rocket bar 185 now to be described in more detail.

From FIGS. 13 and 15, it will be seen that the rocker bar 185 is in the form of an angle bar having a leg 186 and a horizontal flange 187. The rocker bar 185 is mounted on the rearwardly projecting pivot shaft 162 which is mounted as already described on the rear surface of the rear leg 136 of the channel bar 135. For this purpose, a pivot sleeve 188 is suitably secured for example, by welding, on the lower edge of the leg 186 of the rocker bar 185. This pivot sleeve 188 is dimensioned so as to fit around the central portion 164 of the aforementioned pivot shaft 162 with a bronze bearing sleeve 189 disposed therebetween. The pivot sleeve 188 is retained in position on the shaft 162 by nuts 190.

With further reference to FIG. 15, it will be seen that a pin 191 projects downwardly from the undersurface of the horizontal flange 187 of the rocker bar 185 and is received in the upper end of the aforementioned helical compression spring 179. This spring 179 serves to urge the rocker bar 185 to pivot about the pivot shaft 162 so that the cam follower roller 194 normally remains in contact at all times with the cam 232 of the main pulley 225. In the event, however, that the machine 105 is to be used for the setting of the teeth of a saw blade without sharpening such teeth, the rocker bar 185 can be retained in a position in which the cam follower roller 194 is held out of contact with the cam 232. The threaded rod 142 already mentioned is provided for this purpose.

As already indicated, the threaded rod 142 (FIGS. 14 and 15) extends upwardly through the hole 143 in the horizontal web 138 of the channel bar 135. The rod 142 is mounted so that it can be elevated into a position in which its upper end engages the undersurface of the horizontal flange 187 of the rocker bar 185 and so prevents pivoting movement of the rocker bar 185 about the pivot shaft 162.

The manner in which such vertical adjustment of the threaded rod 142 is obtained in the machine 105 shown in the accompanying drawings will not be described with particular reference to FIGS. 16 and 17. It should also be noted that threaded rod adjusting devices of the type shown in FIGS. 16 and 17 are used in several of the sub-assemblies of the machine 105 and the description now to be given will be equally applicable to such other adjusting devices.

From FIG. 16, it will be seen that the threaded rod 142 extends freely through upper and lower flanges 257 and 258 respectively of the bracket 133, a vertical web 259 interconnecting these flanges 257 and 258. A knurled wheel 260 having an internally threaded bore engages the rod 142 between the flanges 257 and 258. A plate 265 is secured to the lower flange 258 projects into the longitudinally extending groove 266 provided in the rod 142 and prevents rotation of that rod. Consequently, when the knurled wheel 260 is manually rotated, the rod 142 is moved axially, i.e., vertically, in a direction depending upon the direction of rotation of the knurled wheel 260.

To prevent accidental movement of the knurled wheel 260, the latter is usefully provided with a number of peripheral dimples 261 which selectively receive a ball 262 urged outwardly of a passage 264 in the vertical web 259 by a helical compression spring 263 disposed therein. The general disposition of the screw adjusting device used for preventing operation of the rocker bar 185 will best be seen by reference to FIGS. 12 and 15.

Referring again to FIG. 13, it will be seen that an arm generally indicated at 201 and comprising a sleeve 202 rotatably mounted on a shaft 203 (FIG. 19) and retained thereon by nuts 205 on a threaded end portion 206 is carried by an upstanding bracket 204 secured to the rocker bar 185 at the right-hand end of the horizontal flange 187 thereof. This arm 201 serves to transmit drive motion to the blade edge-clamping or hold-down sub-assembly 269 and corresponds to part of the line 78 of the machine 62 of FIG. 11.

At its left-hand end, the rocker bar 185 is provided with a forwardly extending arm 198 strengthened by a rod 199 secured therebelow and provided for the purpose of transmitting drive motion from the rocker bar 185 to the blade advance transmission 321 to be described in greater detail hereinafter. It will also be noted that the horizontal flange 187 of the rocker bar 185 is cut away as indicated at 208 to clear the post 146.

Also mounted on the horizontal flange 187 of the rocker bar 185, there is a sharpening wheel elevating support generally indicated at 210. This support comprises a sleeve 212 adjustably mounted on the horizontal flange 187 and having a shaft 211 freely rotatably disposed therein. A shoulder 214 (FIG. 15) restricts forward movement of shaft 211. A threaded rod 213 is supported in a bore 215 (FIG. 15) in this shaft 211 and in turn supports a main shaft of the sharpening wheel 426 as will be explained hereinafter with reference to the sharpening wheel mounting and drive sub-assembly 394. The sleeve 212 is mounted on the flange 187 of the rocker bar 185 by a shaft 216 (FIG. 28) integrally formed with the sleeve 212 and extending downwardly therefrom through an elongated slot 222 in the flange 187. Below the flange 187, the shaft 216 is secured to a threaded rod 217 extending between the arms of a bifurcated bracket 218 secured to the undersurface of the flange 187. Nuts 219 threaded on the rod 217 serve to hold the sleeve 212 in a desired position on the horizontal flange 187.

It can also be usefully noted at this juncture that the sharpening wheel elevating support 210 corresponds generally to the line 74 of the machine 62 of FIG. 11. An arm 220 secured to the horizontal flange 187 of the rocker bar 185 is provided in front of the support 210 to anchor a helical tension spring 221 while the flange 187 is cut away to the right of the support 210 at 223 to provide clearance for the sharpening wheel 426.

Drive motion is also transmitted from the rocker bar 185 to the blade transverse clamping sub-assembly 184 as will be explained hereinafter in greater detail.

It will now be understood that the main drive power source and transmission 183 already described corresponds generally to the main drive power source 71 of the machine 62 of FIG. 11. It should also be explained that, while the transmission of drive motion from the rocker bar 185 to several of the sub-assemblies has already been described, rotary drive motion for the sharpening wheel 426 is transmitted directly from the main drive shaft 247 by belt 255 and that drive motion is transmitted to the tooth-setting sub-assembly 440 directly from a drive gear 236 (FIG. 12) keyed on the right-hand end of the main pulley shaft 226 as will be further explained hereinafter.

5. Blade support and transverse clamping sub-assembly

The structure of the blade support and transverse clamping sub-assembly 184 will now be described with particular reference to FIGS. 15, 23 and 24. It should perhaps first be noted, however, from FIG. 12 that the saw blade 107 is disposed in a generally vertical plane behind the movable front clamping 348 and in front of the front leg 137 of the front channel bar 135. The front clamping plate 348 is provided at its lower edge in proximity to its ends with hinge sleeves 349 and 350 and hinge pins 352 key these hinge sleeves to the hinge sleeves 169 and 170 respectively of the front channel bar 135 as will readily be understood by reference to FIG. 23.

Four bars 352, 353, 354, and 355 of square cross-sectional configuration are mounted in spaced apart positions along the upper rear edge of the movable clamping plate 348. These bars are positioned so as to be opposite the similar bars 172, 173, 174, and 175 provided on the front upper edge of the fixed clamping plate constituted by the front leg 137 of the channel bar 135. The hinge sleeves 169, 170, 349, and 350 are so dimensioned and positioned that, in operation of the machine 105, the saw blade 107 is clamped between opposite pairs of the bars 172 to 175 and 352 to 355.

A blade support generally indicated at 364 and corresponding to the blade support 63 of the machine 62 of FIG. 11 is provided between the leg 137 of the channel bar 135 and the front clamping plate 348 to support the lower edge surface of the saw blade 107. The position of this blade support 364 is vertically adjustable.

Figure 24:
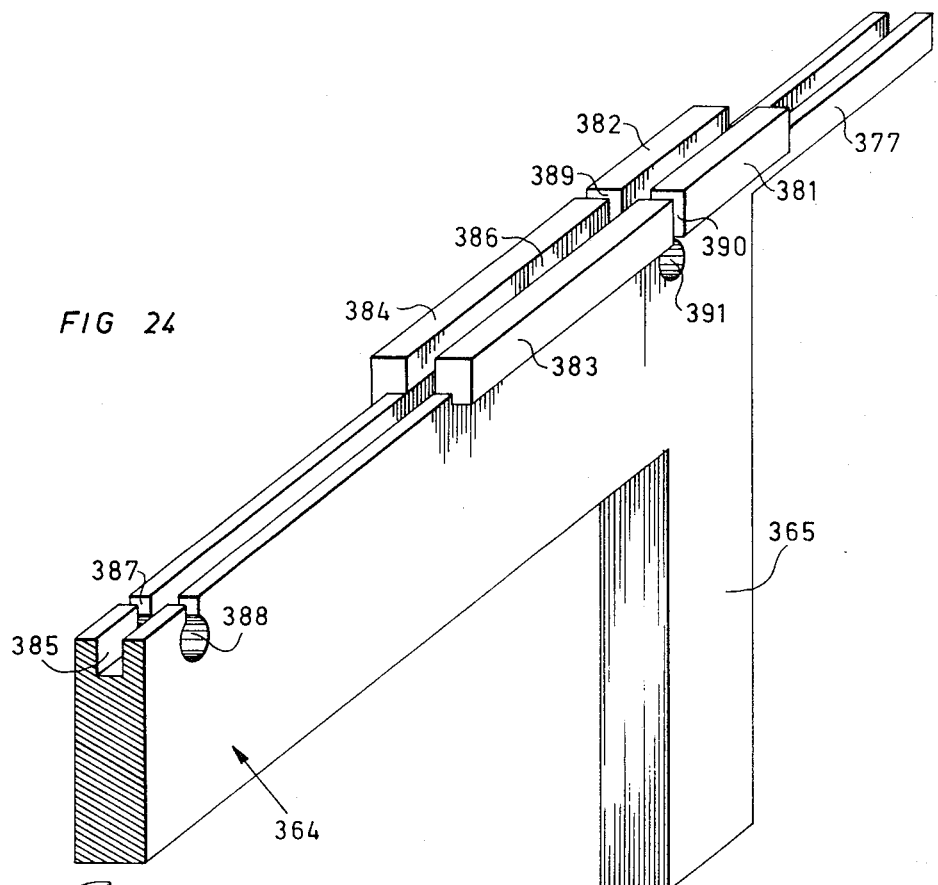
FIG. 24 is an enlarged, fragmentary front perspective view showing in greater detail the blade support illustrated in FIG. 23.
Figure 23:
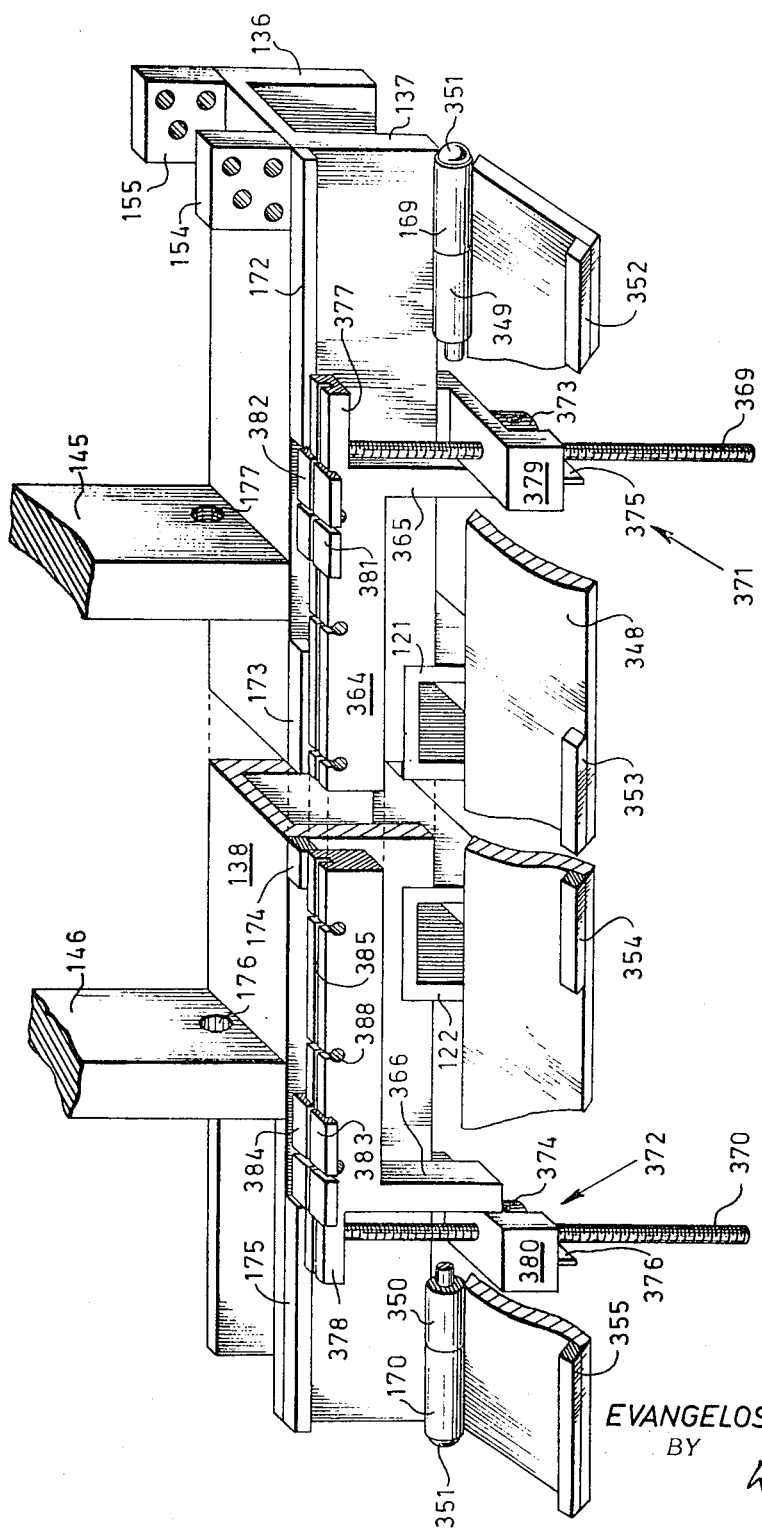
FIG. 23 is a fragmentary, front perspective view of the machine of FIG. 12 showing in greater detail the transverse blade-clamping mechanism, the front clamping plate being pivoted forwardly to reveal the support provided for maintaining the saw blade at a desired height.

Referring now to FIG. 23 and for greater detail to FIG. 24, it will be seen that the blade support 364 is provided along its upper edge with a blade-receiving groove 385 while transverse slots 387 and transverse bores 388 are provided to permit the escape of metal filings deposited during the sharpening operation.

Since the blade support 364 is usefully formed with a thickness less than the separation between the leg 137 and the movable clamping plate 348 to facilitate its vertical adjustment, the blade support 364 is usefully provided at each of its ends on its upper edge with opposed pairs of bars 381, 382 and 383, 384 of rectangular cross-sectional configuration and defining a blade-receiving groove 386 in alignment with the aforementioned groove 385. Gaps 389 and 390 between adjacent ones of the bars 382, 384 and 381, 383 are provided to permit the escape of metal filings into a transverse bore 391 through the blade support 364 therebelow.

The blade support 364 is provided near its ends with downwardly extending legs 365 and 366 for guiding the blade support 364 during adjustment of its vertical position. For effecting such vertical adjustment, the blade support 364 is provided with arms 377 and 378 which are supported on the upper ends of threaded rods 369 and 370 respectively as shown in FIG. 23. The vertical positions of these threaded rods 369 and 370 are manually controlled by threaded rod adjusting devices generally indicated at 371 and 372 respectively and similar in their construction to that already described for adjusting the vertical position of the threaded rod 142 (FIG. 14, 15, 16, and 17). To this end, each of the rods 369 and 370 is engaged by a knurled wheel 373 and 374 respectively mounted in supporting brackets 379 and 380 respectively which in turn are suitably mounted on the lower edge of the front leg 137 of the channel bar 135 so as to extend forwardly therefrom. Plates 375 and 376 are provided on these brackets 379 and 380 respectively to engage longitudinally extending grooves provided in the rods 369 and 370 respectively. The knurled wheels 373 and 374 are of such a diameter that the legs 365 and 366 respectively of the blade support 364 are freely guided by the inner opposed edges of the brackets 379 and 380 respectively during adjustment of the vertical position of the blade support 364.

Periodic reciprocation of the front clamping plate 348 between a blade-clamping position and a blade-releasing position is effected by a vertical arm 356 secured to the front clamping plate 348 in a manner yet to be described and integrally formed at its lower end with a rearwardly extending arm 357 as will best be seen by reference to FIGS. 12, 13, and 15.

At its rearward end, the arm 357 has mounted thereon a threaded rod adjusting device generally indicated at 358 and of the same type as that shown in FIGS. 16 and 17. This adjusting device includes a knurled wheel 359 in which there is threadingly received an upstanding threaded rod 360, the upper end of which abuts the undersurface of the horizontal flange 187 of the rocker bar 185 on the left-hand side of the aforementioned pivot shaft 162. A plate 361 as shown in FIG. 13 and mounted on the adjusting device 358 is received within a longitudinally extending groove of the threaded rod 360 to prevent rotation of the latter.

At its upper end, the vertical arm 356 is pivotally connected by a pivot pin 367 between forwardly extending flanges 362 provided near the upper edge of the front clamping plate 348. The vertical arm 356 also extends between a second pair of forwardly extending flanges 363 secured to the front clamping plate 348 near the lower edge thereof and is releasably secured to these flanges 363 by a removable pin 368 extending through aligned holes in these members.

The linkage formed by the vertical arm 356, the rearwardly extending horizontal arm 357 and the threaded rod 360 serves to transmit operating movement from the rocker bar 185 to the front clamping plate 348 for the purpose of pivoting this plate 348 about its hinge pins 351 between a blade-clamping position and a blade-releasing position. This linkage corresponds to the line 70 of the machine 62 of FIG. 11.

Pin 368 is removable to permit ready access to the blade support 364 without disturbing the setting of the threaded rod adjusting device 358.

6. Blade edge-clamping sub-assembly

This sub-assembly generally indicated at 269 will now be described with particular reference to FIGS. 18, 19, and 33 of the accompanying drawings. It will be seen that the sub-assembly 269 comprises a block 271 having a toothed plate 270 detachably secured to its front vertical surface by bolts 272 extending through bores 273 in the plate 270 and into threaded bores 274 in the block 271.

A sleeve 276 is secured on the undersurface of the block 271 has a pivot shaft 275 rotatably extending therethrough and is retained on this shaft against an annular shoulder 277 by nuts 278 threaded on the shaft 275 to the left of the sleeve 276. To the right of the shoulder 277, the shaft 275 extends as a threaded extension 279 which screws into the aforementioned threaded hole 177 through the post 145 near the lower end thereof. A lock-nut 280 is provided for adjustably holding the hold-down clamping sub-assembly 269 in a desired longitudinal position on the machine 105.

The block 271 is pivotally mounted about the pivot shaft 275 so that the teeth of the plate 270 can be lowered into a blade-engaging position and raised into a blade-releasing position. Such pivoting movement of the block 271 is obtained automatically in the machine 105 by movement of the aforementioned arm 201 of the rocker bar 185 during rocking movement of the latter about the pivot shaft 162. For this purpose, a sleeve 283 is freely supported by a shaft 285 (FIG. 19) extending rearwardly from the block 271. At its forward end, the sleeve 283 is guided by an enlarged portion 284 and is retained on the shaft 285 by a nut 287. The sleeve 283 is disposed below the arm 201 and is maintained in contact with the sleeve 202 of that arm 201 by a helical tension spring 282 anchored at its lower end at the rearward end of a second arm 281 (FIG. 18) extending rearwardly from the block 271. The upper end of the spring 282 is suitably anchored on the main supporting frame 110 of the machine 105, for instance, on the right-hand post 145 as shown in FIG. 12.

The blade edge-clamping or hold-down sub-assembly 269 of the machine 105 corresponds to the clamping mechanism 76 of the machine 62 of FIG. 11 while the arm 201 and the sleeve 283 on the shaft 285 of the machine 105 together correspond to the line 78 of the machine 62 of FIG. 11.

So that the machine 105 can be used with saw blades having teeth of several pitch values, a number of different plates 270 are usefully provided. In accordance with another feature of this invention, such plates 270 are usefully formed with teeth having a configuration such as shown in FIG. 33 for the plate 270a illustrated therein. It will be seen that each of the teeth of the plate 270a comprises a lower tooth-engaging portion 500 with a cut-away portion 501 thereabove. A similar cut-away portion 502 is provided at the upper end of the sloping edge of each tooth. In the use of such a plate, the teeth of the saw blade are engaged by the lower portions 500 while the higher portions (i.e., nearer the points) of the saw blade teeth are not engaged by the plate 270a. Consequently damage and wear of the saw blade teeth when they are clamped by the plate 270a in the machine 105 is considerably reduced.

7. Blade advance mechanism

The sub-assembly generally indicated at 290 in FIGS. 12, 18 and 20 corresponds to the blade advance mechanism 80 of the machine of FIG. 11. The blade advance transmission sub-assembly 321 which corresponds to the line 82 of the machine 62 of FIG. 11 and which transmits drive movement from the rocker bar 185 to the blade advance mechanism 290 will not, however, be described in the present sub-section and will instead by described in a subsequent one.

Referring to FIGS. 18 and 20, it will be seen that the blade advance mechanism 290 comprises a toothed plate 291 corresponding to that shown at 83 in FIG. 11 and, as was the case for the teeth 83, the toothed plate 291 is mounted for periodic reciprocation both in the vertical direction and in the longitudinal direction.

The plate 291 is carried by a shaft 292 freely mounted for longitudinal reciprocation in a sleeve 293 with the plate 291 projecting downwardly through an elongated slot 294 cut through the wall of the sleeve 293. The sleeve 293 is itself secured to the undersurface of a rearwardly extending arm 295 at the forward end of the latter. Along its rearward edge, the arm 295 is in turn secured to a tubular member 296 itself rotatably supported on a generally horizontal shaft 297 projecting to the left-hand side of an upright mounting plate 298, this plate 298 being secured by bolts 299 and nuts 300 (FIG. 12) to the outer leg of the transverse channel bar 121. A nut 301 (FIG. 18) serves to retain the tubular member 296 rotatably on the shaft 297.

An arm 302 secured to the tubular member 296 and extending rearwardly therefrom has a helical tension spring 303 anchored thereto. This spring 303 which has its upper end suitably anchored to the supporting frame 110 of the machine 105, for example, to the upright post 145 at the upper end thereof urges the tubular member 296 to rotate about the shaft 297 to lower the toothed plate 291 so that the lower end of a threaded rod 304 adjustably secured to the arm 295 remains at all times in contact with the top surface of the horizontal flange 187 of the rocket bar 185.

The threaded rod 304 is adjustably secured to the arm 295 by means of a screw adjusting device generally indicated at 305 similar to that shown in FIGS. 16 and 17. The device 305 includes a knurled wheel 306 while a plate 307 secured to the adjusting device 305 is received within a longitudinally extending groove in the rod 304 to prevent rotation of the latter when the wheel 306 is turned by hand to adjust the vertical position of the arm 295 and consequently of the toothed plate 291.

Referring again to the shaft 292 carrying the toothed plate 291 and slidably disposed within the sleeve 293, it should be noted that, in order to permit simple replacement of this shaft 292 by another such plate with teeth of a different pitch, the shaft 292 is axially bored as at 314 and has an intersecting and threaded radial bore through its left-hand end 308 in which bore a bolt 309 is screwed. This bolt 309 serves to connect the shaft 292 to a cable connector 312 having a pin 313 (FIG. 20) which is detachably secured in the left-hand end of the axial bore 314 by the bolt 309. It should also be explained that the plate 291 shown in FIGS. 18 and 20 might usefully be replaced with a similar plate which has teeth shaped like those of the plate 270a of FIG. 33 for the purpose of reducing the risk of damage or wear to the teeth of the saw blade during its engagement by such a plate.

Rearwardly of the shaft 292, the cable connector 312 is provided with a bore 315 (FIG. 20) in which the end of the cable 181 is retained by a bolt 316. The blade advance mechanism 290 is essentially completed by a helical tension spring 310 (omitted from FIG. 20) connecting the bolt 309 to a bracket 311 mounted on the forward end of the arm 295. This spring 310 urges the shaft 292 against its movement to the left under the control of the cable 181.

It will be understood that periodic vertical reciprocation of the blade advance mechanism 290 as indicated by the arrow U for the machine 62 of FIG. 11 is obtained in the machine 105 by the engagement of the lower end of the threaded rod 304 with the top surface of the horizontal flange 187 of the rocker bar 185. Longitudinal advance movement to the left of the blade advance mechanism 290 is obtained by corresponding movement of the cable 181 while longitudinal retraction of the mechanism 290 in the opposite direction is obtained by the action of the spring 310.

8. Blade advance transmission

Figure 21:
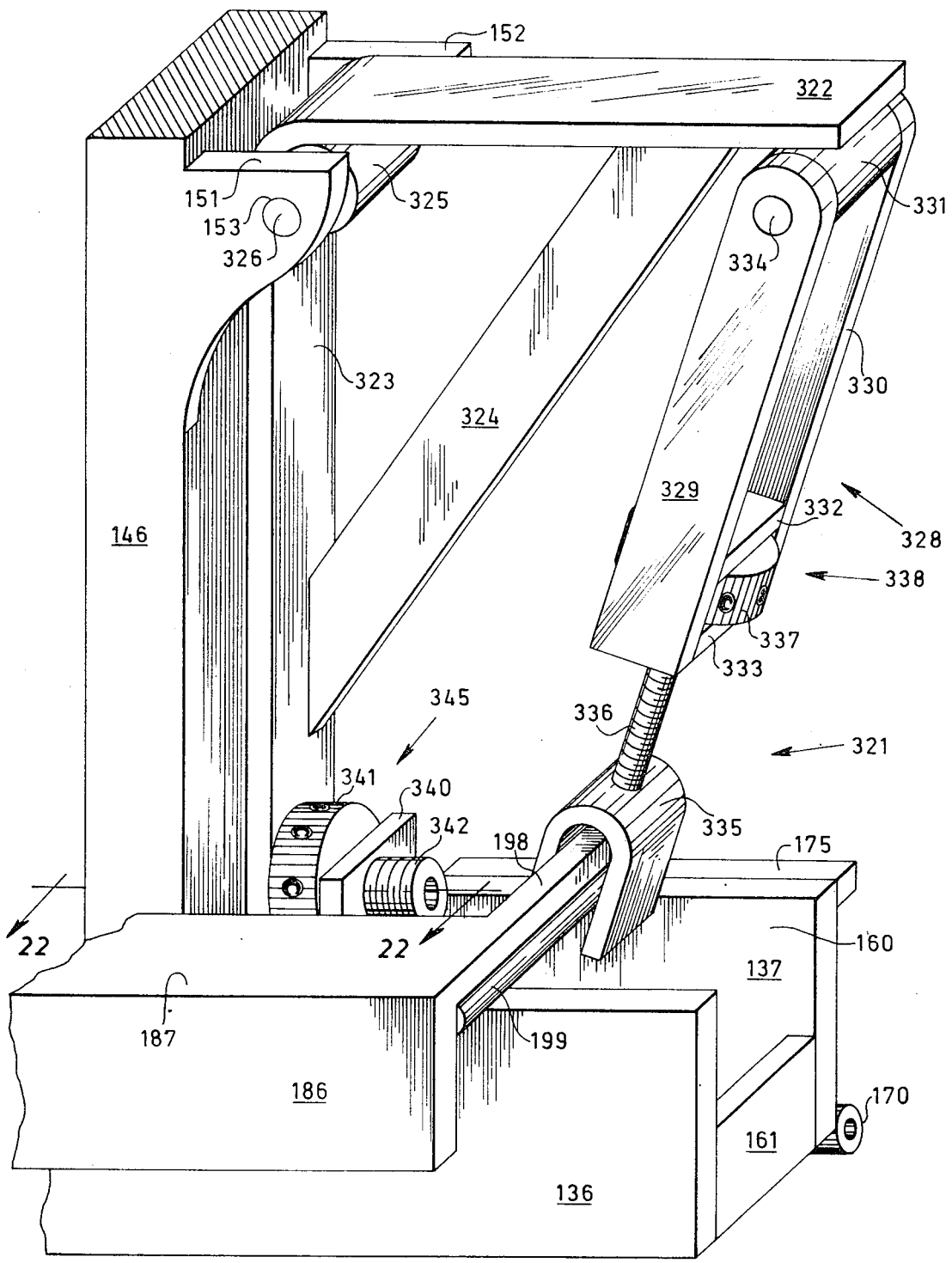
FIG. 21 is an enlarged, fragmentary perspective view of the blade advance transmission provided in the machine of FIG. 12 for transmitting drive motion to the blade-advance mechanism shown in FIGS. 18 and 20.
Figure 22:
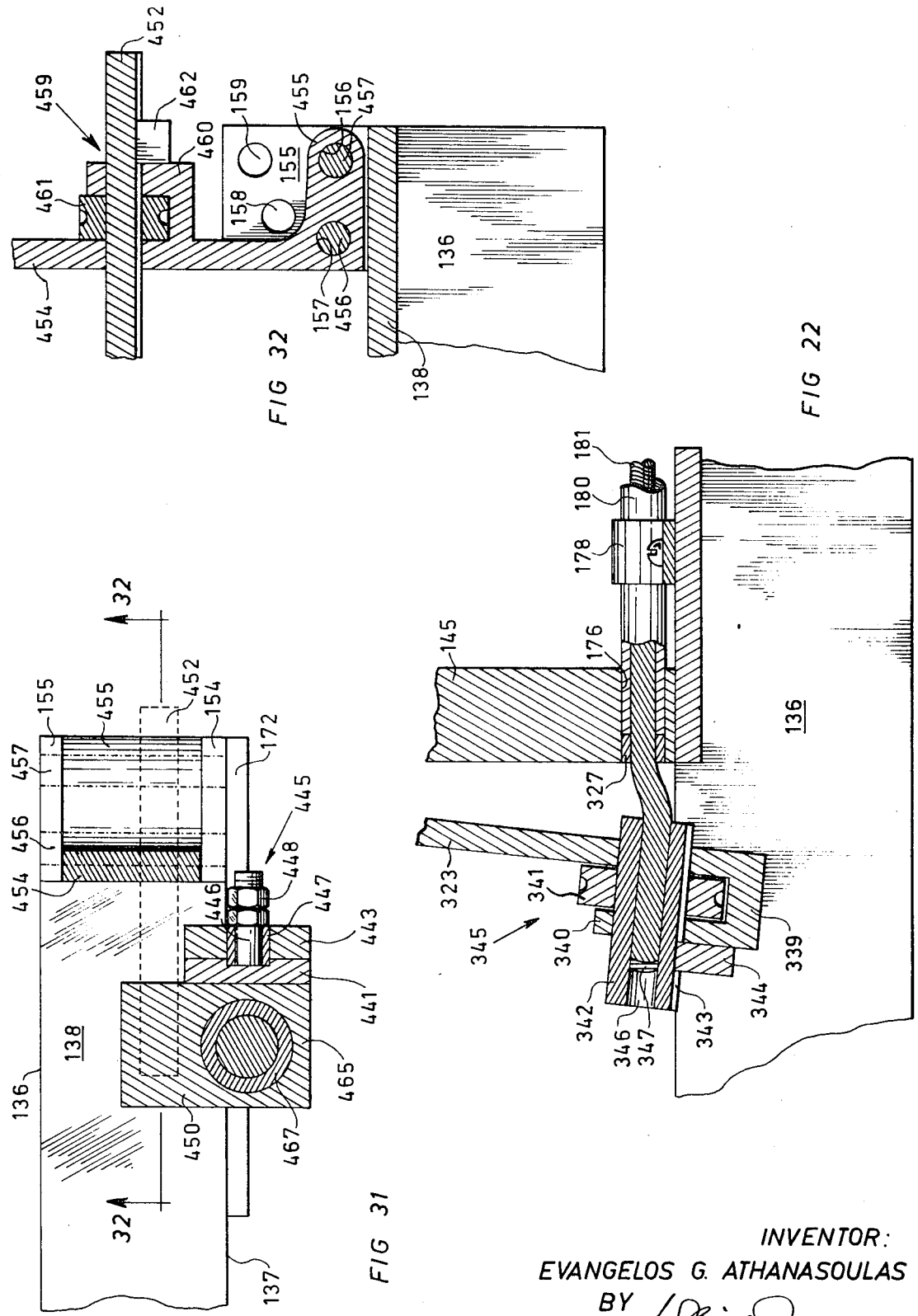
FIG. 22 is a fragmentary, vertical sectional view taken along the line 22—22 of FIG. 21 showing the attachment to the mechanism of FIG. 21 of a cable which is provided for transmitting drive movement to the blade-advance mechanism.

The blade advance transmission 321 is illustrated in FIGS. 12, 21, and 22. The purpose of this sub-assembly is to transfer drive movement from the rocker bar 185 to the blade advance mechanism 290 already described. The transmission 321 corresponds generally to the line 82 of the machine 62 of FIG. 11.

Referring to FIGS. 12 and 21, it will be seen that the blade advance transmission 321 comprises a bell crank member having a generally horizontal arm 322 and a generally vertical arm 323. The arms 322 and 323 are interconnected by a diagonal brace 324. At their knuckle, the arms 322 and 323 are secured to a sleeve 325 which is pivotally mounted by a shaft 326 extending through the sleeve 325 and through the bores 153 in the flanges 151 and 152 of the post 146.

A sleeve 331 is secured transversely to the outer end of the horizontal arm 322 and a swinging arm pivoted in this sleeve 331 is generally indicated at 328 and comprises transversely spaced apart plates 329 and 330. These plates 329 and 330 are secured to the ends of the sleeve 331 and are separated at their lower ends by spaced apart webs 332 and 333. A pivot pin 334 extends through openings in the plates 329 and 330 at the upper ends thereof and through the sleeve 331 to mount the swinging arm 328 on the horizontal arm 322 for swinging movement thereon.

A bifurcated member 335 is secured to the lower end of a threaded rod 336 which is in turn supported at its upper end by a screw adjusting device generally indicated at 338 and of the same type as that already described herein with reference to FIGS. 16 and 17 of the accompanying drawings. The screw adjusting device 338 includes a knurled wheel 337 for adjusting the 'vertical' position of the bifurcated member 335 while a plate (not shown) of the adjusting device 338 prevent rotation of the threaded rod 336. The aforementioned forwardly extending arm 198 reinforced by the rod 199 of the rocker bar 185 is received within the bifurcated member 335.

At its lower end, the generally vertical arm 323 is formed with an upstanding end flange 340 connected to the arm 323 itself by an end plate 339. A screw adjusting device generally indicated at 345 and of the type shown in FIGS. 16 and 17 is provided between the arm 323 and its end flange 340 and includes a knurled wheel 341. A threaded tube 342 is received in the threaded bore of the wheel 341 and the adjusting device 345 includes a plate 344 (FIG. 22) partially disposed within a longitudinally extending groove 343 in the tube 342 to prevent rotation of the latter.

Referring further to FIG. 22, it will be seen that the left-hand end of the cable 181 is secured within a bore 346 of the tube 342, for example, by soldering as indicated at 347. It will also be seen from FIG. 22 that the outer cover 180 of the cable 181 is received within the hole 176 in the upright post 146 and that this hole 176 has a restricted collar 327 at its left-hand end to provide an end abutment for the cable cover 180.

It will now be understood that the generally vertical reciprocation of the arm 198 of the rocker bar 185 is converted by the drive transmission 321 of FIG. 21 into a generally longitudinal reciprocation of the cable 181 and consequently of the blade advance mechanism 290 already described.

9. Sharpening wheel mounting and drive sub-assembly

Figure 26:
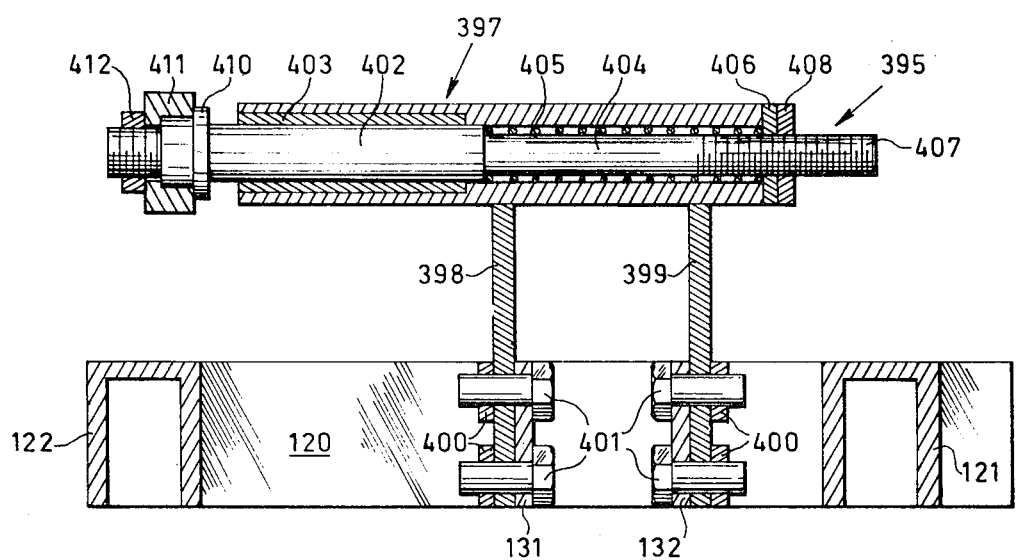
FIG. 26 is a fragmentary, vertical sectional view taken along the line 26—26 of FIG. 25 showing further details of the mechanism provided for supporting the sharpening wheel and for adjusting its position.

This sub-assembly is generally indicated at 394 in FIGS. 12, 25, and 26 of the accompanying drawings while further details of certain component structures thereof are also shown in FIGS. 27 and 28.

Referring first to the front elevation of FIG. 12, it it will be seen that this sub-assembly 394 comprises a main sharpening wheel shaft 421 on which the sharpening wheel 426 is secured between annular flanges 423 by a nut 427 secured on a threaded end portion 425 (FIG. 25) of the shaft 421, a hub 424 integrally formed with the left-hand flange 423 being received within an axial opening in the wheel 426. The shaft 421 is driven by the belt 255 from the pulley 254 on the main drive shaft 247 (FIG. 14).

Referring now in greater detail to FIGS. 25 and 27, it will be seen that the shaft 421 is rotatably mounted in a cylindrical member generally indicated at 419 and carried at the forward end of a rearwardly extending arm generally indicated at 396 which is itself supported at its rearward end on a shaft generally indicated at 395 extending axially from within a tubular member 397.

The tubular member 397 is mounted on the upper ends of upright plates 398 and 399 secured by bolts 401 and nuts 400 to the mounting flanges 131 and 132 respectively of the channel bar 120. Referring to FIG. 26, it will be seen that the shaft 395 has a left-hand end portion 402 slidably and rotatably housed within a bronze sleeve 403 within the tubular member 397. The right-hand portion 404 of the shaft 395 has a reduced diameter and a helical compression spring 405 is disposed around this portion 404 within the tubular member 397 and retained within the latter by an end cap 506 through which a threaded portion 407 of the shaft 395 freely passes. A knurled disc 408 is engaged on the threaded portion 407 of the shaft 395 outwardly of the end cap 406 for the purpose of permitting adjustment of the longitudinal position of the shaft 395 in the tubular member 397.

At the left-hand end of the shaft 395, a collar 411 is rotatably mounted thereon and this collar 411 is axially restricted by an annular flange 410 and by a nut 412 on a threaded left-hand end portion of the shaft 395. A forwardly and upwardly extending cylinder 415 is integrally formed with the collar 411. A bronze sleeve 416 is disposed within the cylinder 415 to permit axial and rotational movement therein of a rearward portion 417 of the arm 396, this rearward portion 417 being disposed angularly to a forward portion 418 of the same arm 396. A bearing 434 is disposed at the rear lower end of the cylinder 415 while an air vent 435 is provided in the cylinder 415 to permit the free passage of air into and from the cylinder 415 behind the 'piston' 417.

At its forward end, the forward portion 418 of the arm 396 is secured to the cylindrical member 419 while a bronze sleeve 420 disposed within the member 419 provides a bearing for the sharpening wheel shaft 421. In proximity to the rearward end of its forward portion 418, the arm 396 has upper and lower plates 428 and 429 respectively secured thereto. A knurled wheel 430 of a screw adjusting device generally indicated at 437 is mounted between these plates 428 and 429 and receives the threaded rod 213 already mentioned. A plate 431 secured to the plate 428 extends into a longitudinally extending groove 432 provided in the rod 213. The lower end 433 of the rod 213 is received within the bore 215 in the shaft 211 of the sharpening wheel elevating support 210 already described and as shown in FIGS. 27 and 28.

An arm 436 extends forwardly from the cylindrical member 419 and the aforementioned helical tension spring 221 connects this arm 436 to the arm 220 of the horizontal flange 187 of the rocker bar 185 to maintain the lower end 433 of the threaded rod 213 in the bore 215.

It will now be understood that the desired vertical reciprocation of the sharpening wheel 426 is transmitted from the rocker bar 185 through the rod 213 to the shaft 421 of the sharpening wheel 426. Adjustment of the vertical position of the sharpening wheel 426 is effected by turning the knurled wheel 430 of the adjusting device 437 while adjustment of the slope of the wheel 426 as indicated by the arrows K for the wheel 72 of the machine 62 of FIG. 11 is possible in the machine 105 by turning the knurled disc 408. Coarse adjustment of the longitudinal position of the wheel 426 is also possible, for example, when fitting a new sharpening wheel on the machine by adjustment of the nuts 219 (FIG. 28) to move the sleeve 212 along the top surface of the horizontal flange 187 of the rocker bar 185.

10. Tooth-setting sub-assembly

Figure 30:
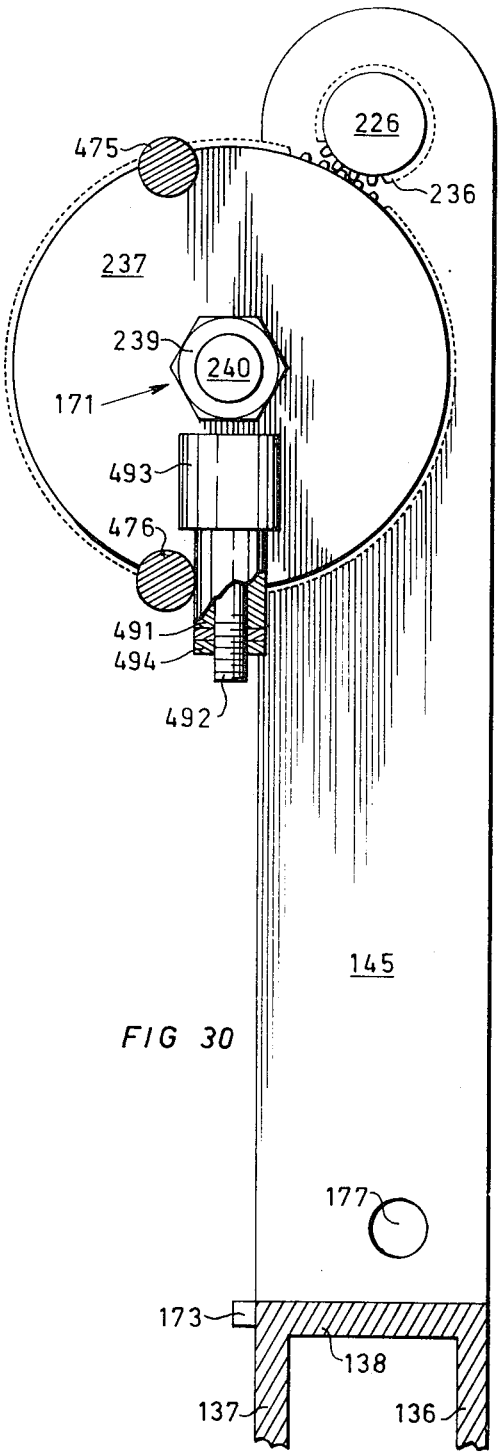
FIG. 30 is a fragmentary side elevation partly in section of the mechanism provided in the machine of FIG. 12 for transmitting drive motion to the tooth-setting mechanism of FIG. 29 when viewed in the direction of the arrows 30—30 of FIG. 12.

The tooth-setting sub-assembly 440 is, as already indicated and as will be seen by reference to FIGS. 12 and 30, driven by a drive gear 236 keyed to the right-hand end of the main pulley shaft 226. This gear 236 engages a driven gear 237 mounted on the shaft generally indicated at 171 which, as already indicated, is provided on the right-hand post 145 by means of a left-hand enlarged end portion 238 as shown in FIG. 12. The gear 237 is retained on this shaft 171 by nuts 239 engaging a threaded outer end portion 240 of the shaft 171.

For a purpose which will become apparent as the description herein proceeds, a sleeve 491 is freely rotatably supported on a shaft 492 disposed radially on the right-hand face of the gear 237 and retained thereon by nuts 494. An enlarged boss 493 maintains the sleeve 491 clear of the surface of the gear 237.

Figure 29:
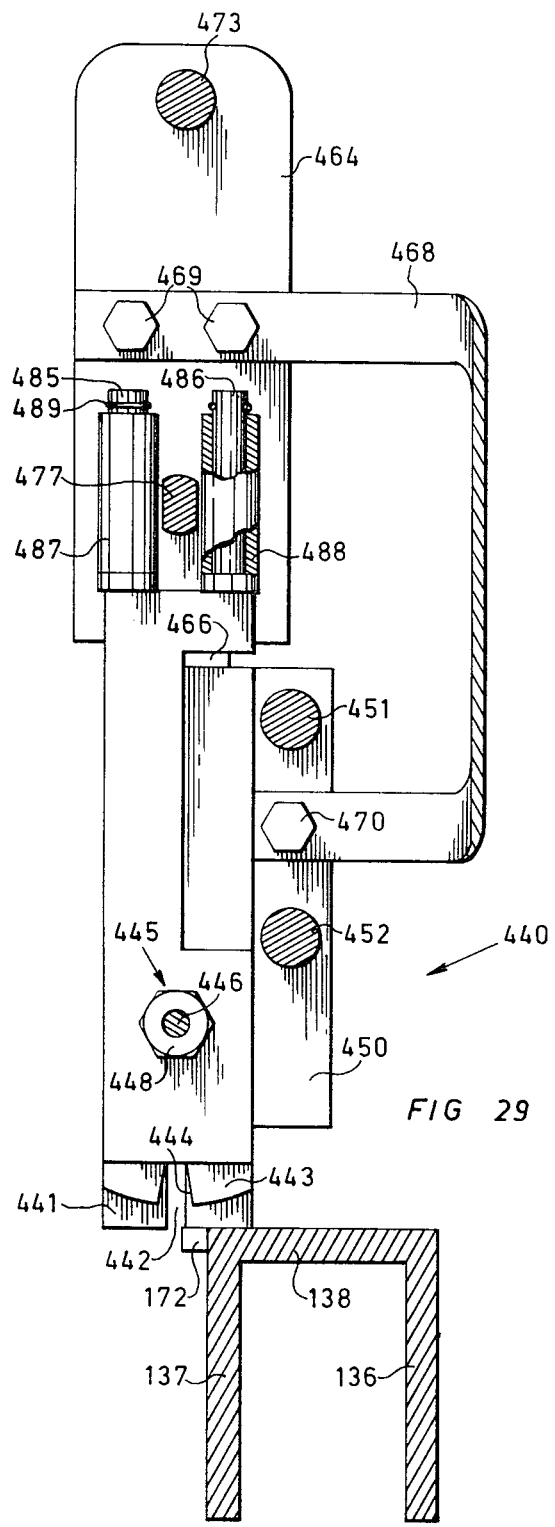
FIG. 29 is a side elevation partly in section of the mechanism provided in the machine of FIG. 12 for setting the teeth of a band saw blade when viewed in the direction of the arrows 29—29 of FIG. 12.

As was the case for the machine 62 of FIG. 11, the tooth-setting mechanism 440 of the machine 105 comprises a fixed slotted plate 441 and pivotally mounted thereon a movable slotted plate 443. Referring to FIG. 29, it will be seen that the fixed plate 441 has an upwardly extending slot 442 formed in its lower end for engaging a tooth 106 of the saw blade 107. The movable plate 443 has a similar slot 444 and is pivoted on the fixed plate as generally indicated at 445 by a sleeve 447 (FIG. 31) disposed around a pivot stud 446 and retained thereon by nuts 448.

The fixed plate 441 is secured to a mounting block 450 which is adjustably supported on the machine 105 by threaded rods 451 and 452 which are secured to the block 450 and extend longitudinally therefrom to the right-hand side of the machine 105. To the right of the movable plate 443, the threaded rods 451 and 452 are supported by screw adjusting devices generally indicated at 458 and 459 respectively, each of which is similar to the device shown in FIGS. 16 and 17.

These adjusting devices 458 and 459 are secured to an upstanding bracket 454 supported as shown in FIGS. 31 and 32 between the upstanding plates 154 and 155 provided at the right-hand end of the front channel bar 135. For this purpose, the bracket 454 is integrally formed at its lower end with a horizontal flange 455 having transverse bores therethrough and from which pins 456 and 457 extend into appropriate pairs of the openings 156, 157, 158, and 159 in the plates 154 and 155. Referring further to FIG. 32, it will be noted that, for normal operation of the machine 105, the pin 457 extends through the openings 156 in the plates 154 and 155 while the pin 456 extends through the openings 157 in these same plates. If it is desired to sharpen the teeth 106 of a saw blade 107 without re-setting them, the pin 456 can be removed and the upstanding bracket 454 carrying the tooth-setting mechanism 440 pivoted upwardly and outwardly about the pin 457 to disengage this mechanism from the gear 237 as will be more readily understood when the description herein has proceeded further. The bracket 454 can be retained in such a displaced position by inserting the pin 456 through either of the pairs of openings 158 and 159.

Referring further to the aforementioned adjusting devices 458 and 459, it will be seen from FIG. 32 that each of these comprises a knurled wheel 461 threaded on a corresponding one of the threaded rods 451 and 452, which wheels are supported by upstanding flanges 460. A plate 462 is provided on each of the adjusting devices 458 and 459 to be received in a longitudinally extending groove in a respective one of the threaded rods 451 and 452 to prevent rotation of these rods. It will now be understood that the longitudinal position of the tooth-setting sub-assembly 440 on the machine 105 can be adjusted by turning the knurled wheels 461. The knurled wheels 461 can also be used to adjust the angle made by the 'line of set' with the longitudinal direction of the saw blade 107.

For the purpose of transmitting pivotal swinging movement to the movable plate 443, transversely spaced apart and upstanding shafts 485, 486 (FIG. 29) are secured to the upper end of the plate 443. Sleeves 487 and 488 are maintained on these shafts 485 and 486 respectively by spring rings 489. The sleeves 487 and 488 engage a flattened end 477 of a threaded rod 474 which extends between the sleeves 487 and 488 and which is pivotally mounted on the block 450 in a manner now to be described.

Referring to FIGS. 12, 29, and 31, it will be seen that a generally upstanding plate 464 is secured to a downwardly extending shaft 465 which is rotatably supported on a bronze sleeve 467 provided in a generally vertical bore in the block 450. A collar 466 integrally formed with the shaft 465 restricts downward movement of the shaft 465 through the block 450.

The aforementioned threaded rod 474 extends through the plate 464 and is adjustably secured thereto by a screw adjusting device generally indicated at 479 and similar to such devices as already described herein. The devices 479 includes a knurled wheel 481 and a plate 483 received within a longitudinally extending groove in the rod 474. The left-hand end of the rod 474 is unthreaded as indicated at 476.

A threaded rod 473 with an unthreaded left-hand end portion 475 extending through the plate 464 near the upper end thereof is similarly adjustable to the lower rod 474. To this end, the rod 473 has associated therewith a screw adjusting device generally indicated at 478 and including a knurled wheel 480 and a groove-engaging plate 482.

A resilient metal strap 468 interconnects the plate 464 to which it is secured by bolts 469 and the block 450 to which it is secured by a bolt 470 for the purpose of urging the movable plate 443 to return, when moved therefrom, to its neutral or central tooth-releasing position.

In operation of the tooth-setting sub-assembly 440, rotation of the gear 237 causes the sleeve 491 (FIG. 30) periodically to engage the unthreaded portions 475 and 476 of one or both of the rods 473 and 474 respectively. Such engagement causes the plate 464 to turn in the block 450 on its shaft 465. This movement in turn causes the flattened part 477 of the lower rod 474 to engage one or the other of the sleeves 487 and 488 on the shafts 485 and 486 respectively on the movable plate 443 to cause the latter to pivot or swing about its pivot generally indicated at 445. This pivoting movement in turn causes the saw tooth engaged in the slot 444 of the movable plate 443 to be set transversely.

It will further be appreciated that the degree of setting can be adjusted by means of the adjusting devices 478 and 479 while the setting sequence can be varied by the use of different gears 237. For example, the teeth of a saw blade can be set alternately to each transverse side of the saw blade by the use of a certain sized gear 237 while with a larger gear ratio alternate teeth may be left unset as already described with reference to FIGS. 5 to 10 of the accompanying drawings.

11. Operation and adjustment of the machine

The operation of the machine 105 will now be summarized. Assuming that the machine is to be used for both sharpening and re-setting the teeth 106 of a saw blade 107, the knurled wheel 260 (FIGS. 12 and 15) is first turned to disengage the upper end of the threaded rod 142 from the undersurface of the horizontal flange 187 of the rocker bar 185. The pin 368 (FIGS. 12 and 15) is next removed to release the movable front clamping plate 348 to allow this plate to pivot forwardly on its hinge pins 351.

The lower edge of the saw blade 107 is then inserted into the blade-receiving grooves 385 and 386 (FIGS. 23 and 24) of the blade support 364. For such initial insertion of the saw blade 107 into the machine 105, the main pulley 225 is usefully first rotated slightly by hand until the sharpening wheel 426 and the toothed plate 270 (FIG. 12) of the blade edge-clamping or hold-down sub-assembly 269 are elevated above the teeth 106 of the saw blade 107. For such initial insertion of the saw blade 107, the toothed plate 291 of the blade advance mechanism 290 can also be temporarily elevated by turning the knurled wheel 306 of the screw adjusting device 305 (FIG. 20) and the tooth-setting sub-assembly 440 may also usefully be elevated by removing the pin 456 from the openings 157 in the upstanding plates 154 and 155 and then pivoting the tooth-setting sub-assembly 440 about the remaining pin 457.

With the saw blade 107 correctly seated in the grooves 385 and 386 of the blade support 364, the front clamping plate 348 is next pivoted upwardly about it hinge pins 351, and the pin 368 is re-inserted through the now aligned holes in the vertical arm 356 and the forwardly extending flanges 363 on the front clamping plate 348 (FIGS. 12 and 15). With the threaded rod adjusting device 358 set so that the saw blade 107 is loosely supported between the fixed clamping plate constituted by the front leg 137 of the front channel bar 135 and the movable clamping plate 348, the adjusting devices 371 and 372 (FIG. 23) are next adjusted to raise or lower the blade support 364 until the teeth 106 of the saw blade 107 are disposed at a satisfactory height.

Knurled disc 408 (FIGS. 25 alignment 26) is now rotated to set the sharpening wheel 426 at the correct angle to the vertical. The main pulley 225 is next rotated by hand to lower the sharpening wheel 426 towards the saw blade 107. During this setting-up operation, the blade 107 may be moved a short distance longitudinally by hand in the machine 105 so that its teeth 106 are in correct alignment with the sharpening wheel 426. With the saw blade 107 and the sharpening wheel 426 in correct longitudinal alignment, the threaded rod adjusting device 358 (FIGS. 12 and 15) is turned until, with the sharpening wheel 426 in its lowest position (i.e., its sharpening position) the saw blade 107 is firmly clamped between the opposed set of square bars 172, 173, 174, 175 and 352, 353, 354, 355 (FIG. 23) of the aforementioned fixed and movable clamping plates respectively.

The vertical position of the sharpening wheel 426 is next adjusted by means of the screw adjusting device 437 (FIGS. 25 and 26) and any re-adjustment of the sharpening wheel slope angle is made by turning the knurled disc 408 (FIGS. 25 and 26).

Figure 19:
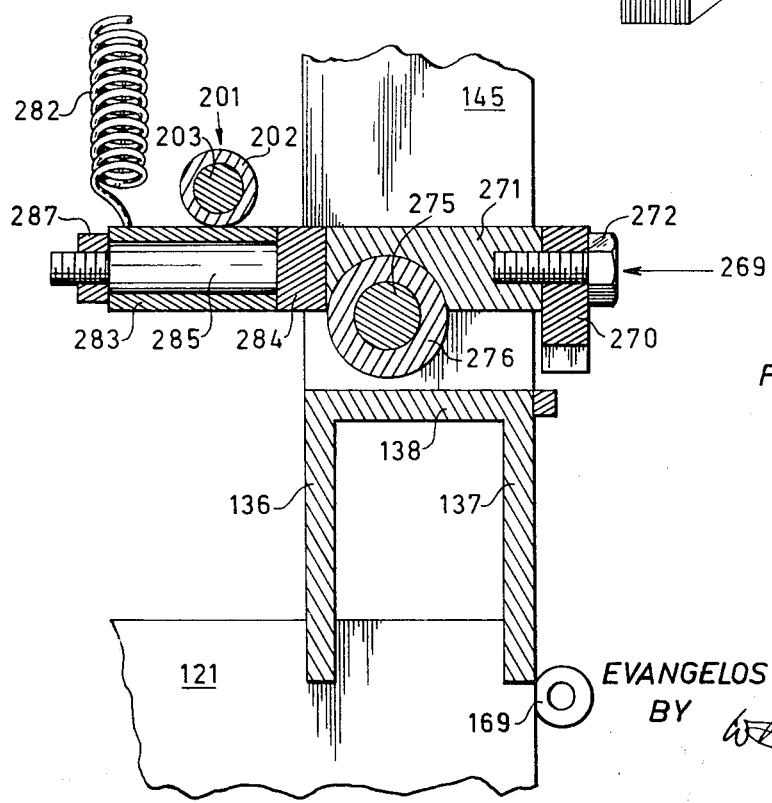
FIG. 19 is a fragmentary, vertical sectional view taken along the line 19—19 of FIG. 18 showing further details of the blade edge-clamping mechanism provided for holding down the saw blade.

With the saw blade 107 and the sharpening wheel 426 in their correct relative positions, attention is next given to the blade edge-clamping or hold-down sub-assembly 269 (FIGS. 12, 18, and 19). If the teeth of the appropriate toothed plate 270 or 270a (FIG. 33), i.e., one with teeth of the correct pitch-bolted at 272 on this sub-assembly 269 are not correctly meshed with the teeth 106 of the saw blade 107, the longitudinal position of the edge-clamping sub-assembly 269 is adjusted by releasing the lock-nut 280 and screwing the threaded extension 279 of the shaft 275, as required, through the threaded hole 177 in the post 145. With the toothed plate 270 moved into its correct position, the lock-nut 280 is re-tightened.

The next adjustment to be made is to the blade advance mechanism 290 (FIGS. 12, 18 and 20). With a shaft 292 carrying a suitable toothed plate 291 (i.e., one with teeth of the correct pitch) disposed in the sleeve 293, the main pulley 225 is manually rotated to lower the advance mechanism 290 into meshing engagement with the teeth 106 of the saw blade 107. During this operation, the screw adjusting device 305 is used to adjust the vertical position of the toothed plate 291, as necessary, while the screw adjusting device 345 (FIG. 21) is used to adjust the longitudinal position of the toothed plate 291 so that the latter is in correct meshing engagement with the saw blade teeth 106.

The screw adjusting device 338 (FIG. 21) of the blade advance transmission 321 is next used to adjust the extent of longitudinal travel of the saw blade 107 through the machine 105 for each rotation of the main pulley 225 to a distance corresponding to the separation between two adjacent teeth 106 of the saw blade 107.

If, as indicated, the machine 105 is also to be used for setting the teeth 106 of the saw blade 107, the tooth-setting sub-assembly 440 must also be adjusted prior to operation of the machine 105. In such an adjusting operation, a driven gear 237 with an appropriate number of teeth is first installed on the shaft 171 of the machine 105 to provide the desired tooth-setting sequence as already explained. The pin 456 is now inserted into the openings 157 in the upstanding plates 154 and 155 after the tooth-setting sub-assembly 440 has been pivoted about pin 457 into the position actually shown in FIG. 12.

The screw adjusting devices 458 and 459 (FIG. 12) are next used to adjust the longitudinal position of the tooth-setting sub-assembly 440 on the machine 105 as well as to obtain the desired angle between the 'line of set' (D—D of FIG. 10) and the longitudinal direction of the saw blade 107. Finally, the screw adjusting devices 478 and 479 (FIG. 12) are adjusted to give the required transverse angle or degree of set.

With the machine 105 now correctly 'set-up', drive power is supplied to the main drive shaft 247 (FIG. 14) from which such power is transmitted by the belt 255 to the sharpening wheel shaft 421 and by the belt 234 to the main pulley 225 and consequently to the cam 232 and to the drive gear 236 for the tooth-setting sub-assembly 440.

The cam follower roller 194 (FIGS. 12 and 15) is maintained at all times in contact with the cam 232 by the action of the helical compression spring 179 (FIGS. 13 and 15) and consequently the rocker bar 185 pivots periodically about the pivot shaft 162. Since the manner in which the various sub-assemblies hereinbefore described have already been explained in some detail, it is considered sufficient at this time merely to summarize such operations.

The reciprocating pivotal movement of the rocker bar 185 functions periodically to clamp and release the saw blade 107 by both the front clamping plate 348 and the hold-down clamping sub-assembly 296. While the saw blade 107 is so clamped, the sharpening wheel 426 is lowered to sharpen a saw blade tooth 106 disposed therebelow.

When the sharpening wheel 426 is elevated, the aforementioned clamping mechanisms are released and the blade advance mechanism 290 is moved in engagement with the saw blade 107 longitudinally to the left by the blade advance transmission 321.

During the cyclic operation of the machine 105, the tooth-setting sub-assembly 440 operates to set the teeth 106 of the saw blade 107 in the desired manner.

As hereinbefore indicated, the machine 105 of the present invention operates effectively and rapidly. A further understanding of the operating sequence of the machine 105 will be obtained by reference to the following table which indicates the operational status of each of the principal sub-assemblies at various times during a single operating cycle. The letters shown in the table correspond to the solid line arrows of FIG. 11 of the accompanying drawings. It will also be seen from the table that the total duration of a single operating cycle of the particular machine 105 is illustrated in FIGS. 12 to 33 of the accompanying drawings is very low, being only 0.652 second.

If the machine 105 is to be used for sharpening the teeth 106 of the saw blade 107 without re-setting them, the tooth-setting sub-assembly 440 is rendered inoperative in the manner already described. If, on the other hand, the machine 105 is to be used for re-setting the teeth 106 without sharpening them, the tooth-setting sub-assembly 440 is set up in the manner already described and the threaded rod 142 is moved upwardly by turning the knurled wheel 260 so that the upper end of the rod 142 engages the rocker bar 185 and holds the cam follower roller 194 continually away from the cam 232.

TABLE

| Duration (seconds) | Operational step number | Movable clamping plate 348-transverse reciprocation (J) | Blade hold-down clamp 269-vertical reciprocation (R) | Sharpening wheel 426-vertical reciprocation (M) | Blade advance mechanism 290 ||| Tooth-setting subassembly 440-pivotal reciprocation (Z) |
|---|---|---|---|---|---|---|---|---|
| | | | | | Vertical reciprocation (U) | Longitudinal reciprocation (V) | | |
| 0.099 | 1 | Pivots forwardly to release. | Rises away from blade to release. | Rises away from blade. | Lowered-stationary. | Rightward-stationary. | | Central-stationary |
| | 2 | Released-stationary. | Raised-stationary. | Raised-stationary. | Lowered-stationary. | Advances-leftward. | | |
| 0.053 | 3 | Pivots rearwardly to clamp. | Moves downwardly to clamp. | Moves downwardly to shapren. | Retracts upwardly. | Leftward stationary. | | |
| | 4 | | | | Raised-stationary. | Retracts-rightward. | | Pivots to set tooth and pivots back to neutral |
| 0.500 | 5 | Rearward-clamping. | Lowered-clamping. | Lowered-sharpening. | Moves downwardly to engage blade. | Rightward-stationary. | | |
| | 6 | | | | Lowered-stationary. | Rightward-stationary. | | |

I claim:

1. A tooth-setting machine for transversely setting the teeth of a saw blade having an elongated spine and a plurality of teeth extending edgewise outwardly therefrom, each said tooth having a leading edge and a trailing edge and said trailing edge of each said tooth subtending a smaller angle than said leading edge thereof with said elongated spine, which machine comprises a clamping means adapted to be moved between blade-clamping and blade-releasing positions; a first tooth-engaging member associated with said clamping means and adapted releasably to engage a first portion of a tooth of said saw blade, said first portion of said tooth being defined by said trailing edge thereof and by a line of set extending outwardly from said leading edge of said tooth, a second tooth-engaging member pivotally mounted about a pivot axis on said machine and adapted releasably to engage and transversely to deform a second portion of said tooth, said second portion of said tooth being defined by said line of set and by said leading edge thereof and said pivot axis being disposed so as to be substantially coplanar with said elongated spine of said blade, and disposed edgewise outwardly of said blade, and control and drive means adapted to pivot said second tooth-engaging member transversely about said pivot axis to deform said second portion of said tooth with respect to said first portion thereof and with respect to said elongated spine of said blade.

2. A machine as claimed in claim 1 in which said first and second tooth-engaging members are angularly adjustably mounted on said machine whereby the angular position of said line of set with respect to said elongated spine of said blade can be adjusted.

3. A machine as claimed in claim 2 in which said first and second tooth-engaging members are adjustably mounted on said machine whereby the longitudinal position of said line of set on said tooth can be adjusted.

4. A machine as claimed in claim 3 in which said first and second tooth-engaging members together comprise a pair of slotted plates having slots adapted to receive a tooth of said saw blade, said slots being aligned for passage of said teeth of said saw blade therethrough and being pivotally offset with respect to each other during transverse setting of said second portion of said tooth being set.

5. A machine for performing a servicing operation on the teeth of a saw blade having a first edge and a second edge defining an elongated spine with a plurality of teeth extending edgewise outwardly from said first edge of said blade, each said tooth having a leading edge and a trailing edge and said trailing edge of said tooth subtending a smaller angle than said leading edge thereof with said first edge of said blade, which machine comprises a clamping means adapted periodically to be moved between a blade-clamping first position and a blade-releasing second position, a blade-advance means comprising a detachable toothed plate for mating engagement with a plurality of said teeth of said saw blade and adapted periodically to be moved between a tooth-engaging first position and a blade-releasing second position and additionally adapted periodically to reciprocate longitudinally in mating engagement with a plurality of said teeth of said blade in a forward direction and for return movement out of engagement with said blade in an opposite longitudinal direction, at least one blade-servicing means adapted periodically to reciprocate between a blade-engaging first position for performing a servicing operation on at least one tooth of said blade and a retracted blade-releasing second position, at least one of said blade-advance means and said blade-servicing means being longitudinally adjustably mounted on said machine to accommodate saw blades of different pitch values, and control and drive means adapted to drive said clamping means, said blade-advance means and said blade-servicing means in operational synchronization whereby said toothed plate of said blade-advance means undergoes conjoint forward movement with said blade while said clamping means and said blade-servicing means are disposed in their blade-releasing second positions and in which said blade is engaged in a clamped position by said blade-clamping means during said blade-servicing operation.

6. A machine as claimed in claim 5 which machine includes a blade support adjustably mounted on said machine to support said saw blades of various widths along said second edge of such a blade for longitudinal advance movement of said blade therealong, and in which said clamping means comprises a first clamping means for periodically transversely clamping said blade and second clamping means including a detachable toothed plate for periodic mating engagement with a plurality of said teeth of said blade to hold said blade with said second edge thereof against said blade support, said first clamping means being adapted for periodic transverse reciprocation between blade-clamping and blade-releasing positions, said toothed plate of said second clamping means being adapted for simultaneous periodic reciprocation towards and away from said first edge of said blade between a teeth-engaging position and a blade-releasing position, and at least two of said blade-advance means, said blade-servicing means and said second clamping means being longitudinally adjustably mounted on said machine to accommodate saw blades of different pitch values.

7. A machine as claimed in claim 6 in which said blade-servicing means comprises a sharpening wheel mounted for rotation about a wheel axis for peripheral sharpening edge engagement with a tooth of said blade, and in which said wheel axis is mounted on said machine for periodic reciprocation between a sharpening position with said sharpening wheel in peripheral edge engagement with said tooth and a non-operative blade-releasing position for longitudinal forward advance of said blade through said machine by said blade-advance means.

8. A machine as claimed in claim 7 in which said wheel axis is angularly adjustably mounted on said machine for varying the sharpening angle of said sharpening wheel with respect to said first edge of said blade.

9. A machine as claimed in claim 6 in which said blade-servicing means comprises a tooth-setting means adapted transversely to set a tooth of said saw blade about a line of set extending edgewise outwardly from the leading edge of that tooth.

10. A machine as claimed in claim 9 in which said tooth-setting means is angularly adjustably mounted on said machine whereby the angle subtended by said line of set and said first edge of said blade can be adjusted and in which said tooth-setting means is also adjustable to vary the longitudinal position of said line of set on said tooth.

11. A machine as claimed in claim 6 which comprises a first blade servicing means in turn comprising a sharpening wheel mounted for rotation about a wheel axis for peripheral sharpening edge engagement with a tooth of said blade, in which said wheel axis is mounted on said machine for periodic reciprocation between a sharpening position with said sharpening wheel in peripheral edge engagement with said tooth and a non-operative blade-releasing position for longitudinal forward advance of said blade through said machine by said blade-advance means, and a separate second blade-servicing means comprising a tooth-setting means angularly adjustably mounted on said machine and adapted transversely to set a tooth of said saw blade about an adjustable line of set extending edgewise outwardly from the leading edge of a tooth of said blade, which tooth-setting means is also longitudinally adjustable to vary the longitudinal position of said line of set on said tooth and to accommodate saw blades of different pitch values.

12. A machine as claimed in claim 11 in which said control and drive means and said tooth-setting means are adapted transversely to set said teeth of said saw blade to alternate transverse sides of said blade sequentially therealong.

13. A machine as claimed in claim 12 in which said control and drive means and said tooth-setting means are adapted transversely to set alternate teeth sequentially along said blade.

14. A machine as claimed in claim 12 in which said control and drive means comprises a pivotally mounted rocker bar having associated therewith a cam follower adapted to be maintained in engagement with a cam member carried by a drive shaft, in which pivotal rocking movement of said rocker bar on rotation of said drive shaft is adapted to effect said periodic reciprocation of said wheel axis of said sharpening wheel, said periodic movement of said blade advance means between said first and second positions thereof as well as said periodic longitudinal reciprocation thereof, said periodic transverse clamping of said first clamping means, and said periodic reciprocation of said second clamping means, and in which said tooth-setting mechanism is driven from said drive shaft through an adjustable ratio gear train.

15. A machine as claimed in claim 14 which comprises a bell crank member adapted to be pivotally reciprocated by said rocker bar and to provide said longitudinal reciprocation of said blade advance means, in which said tooth-setting means comprises a pair of slotted plates having slots adapted to receive a tooth of said saw blade, said slots being aligned for the passage of said teeth therethrough and being adapted to be pivotally offset with respect to each other for transverse setting of a tooth of said saw blade.

16. A machine as claimed in claim 15 in which said tooth-setting means is mounted on said machine adjustably for adjustment of its longitudinal position along said blade and for movement inwardly and outwardly towards said first edge of said saw blade, in which a second of said slotted plates is pivotally mounted on a first plate thereof for pivotal movement about a pivot axis positioned so as to be substantially coplanar with said saw blade outwardly of said teeth thereof, in which said second plate of said tooth-setting means comprises a pair of arms embracing a winging arm pivotally mounted about an axis perpendicular to said pivot axis and adapted to be engaged by a cam member of said gear train whereby said arm serves to pivot said second slotted plate with respect to said first slotted plate on rotation of said cam member of said gear train.

17. A machine as claimed in claim 4 in which said control and drive means includes a drive shaft and in which said second tooth-engaging member is driven for transverse pivotal movement thereof from said drive shaft through an adjustable ratio gear train.

18. A machine as claimed in claim 17 in which said second tooth-engaging member comprises a pair of arms embracing an arm pivotally mounted about an axis generally perpendicular to said pivot axis and adapted to be engaged by a cam member of said adjustable ratio gear train whereby said arm serves to pivot said second tooth-engaging member about said pivot axis with respect to said first tooth-engaging member on rotation of said cam member of said gear train.

19. A machine for performing a servicing operation on the teeth of a saw blade having a first edge and a second edge defining an elongated spine with a plurality of teeth extending edgewise outwardly from said first edge of said blade, each said tooth having a leading edge and a trailing edge and said trailing edge of each said tooth subtending a smaller angle than said leading edge thereof with said first edge of said blade, which machine comprises a longitudinal clamping means adapted periodically to be pivoted transversely between a blade-clamping first position and a blade-releasing second position, a blade-advance means adapted periodically to be moved between a tooth-engaging first position and a blade-releasing second position and additionally adapted periodically to reciprocate longitudinally in engagement with said blade in a forward direction and for return movement out of engagement with said blade in an opposite longitudinal direction, at least one blade-servicing means adapted periodically to reciprocate between a blade-engaging first position for performing a servicing operation on at least one tooth of said blade and a retracted blade-releasing second position, and control and drive means including a rocker bar pivotally mounted on a transverse pivot shaft and provided with a cam follower adapted to be maintained in engagement with a cam member carried by a drive shaft to cause pivotal rocking movement of said rocker bar on rotation of said drive shaft in turn to drive said longitudinal clamping means, said blade-advance means and said blade-servicing means in operational synchronization whereby said blade-advance means undergoes conjoint forward movement with said blade while said longitudinal clamping means and said blade-servicing means are disposed in their blade-releasing second positions and in which said blade is engaged in a clamped position by said longitudinal blade-clamping means during said blade-servicing operation.

20. A machine as claimed in claim 19 which comprises a bell crank member pivotally mounted about a transverse axis and adapted to be pivotally reciprocated about that transverse axis by said pivotal rocking movement of said rocker bar, said bell crank member being coupled to said blade-advance means to cause said advance forward movement of said blade-advance means in engagement with said saw blade during each said pivotal rocking movement of said rocker bar.

21. A machine as claimed in claim 19 in which said control and drive means includes a linkage coupled to said longitudinal clamping means and operatively associated with said rocker bar whereby said clamping means is pivoted between said first and second positions thereof during each said pivotal rocking movement of said rocker bar.

22. A machine as claimed in claim 21 in which said linkage is adjustable whereby said longitudinal clamping means can accommodate saw blades of different thicknesses.

23. A machine as claimed in claim 19 and which additionally comprises a blade support adapted to support said saw blade along said second edge thereof and a second blade-clamping means for periodically engaging said blade to hold that blade with said second edge thereof against said blade support, said second clamping means being pivotally mounted about a longitudinally extending shaft and engaging said rocker bar so that said second clamping means pivots toward and away from said first edge of said blade between a blade-engaging first position and a blade-releasing second position simultaneously with pivoting movement of said longitudinal clamping means between said blade-clamping first position and said blade-releasing second position respectively thereof during each said pivotal rocking movement of said rocker bar.

24. A machine as claimed in claim 19 in which said blade-servicing means comprises a sharpening wheel mounted for rotation about a wheel axis for peripheral sharpening edge engagement with a tooth of said blade, in which said wheel axis is mounted on a transverse arm in turn pivotally mounted on said machine, and whereby, during said pivotal rocking movement of said rocker bar, said sharpening wheel is caused to undergo reciprocation between a sharpening position with said sharpening wheel in peripheral edge engagement with said tooth and a non-operative blade-releasing position for longitudinal forward advance movement of said blade through said machine by said blade-advance means.

* * * * *